United States Patent
Jang et al.

(10) Patent No.: US 11,876,957 B2
(45) Date of Patent: Jan. 16, 2024

(54) METHOD AND APPARATUS FOR PROCESSING VIDEO DATA

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 17/413,419

(22) PCT Filed: Dec. 18, 2019

(86) PCT No.: PCT/KR2019/017983
§ 371 (c)(1),
(2) Date: Jun. 11, 2021

(87) PCT Pub. No.: WO2020/130617
PCT Pub. Date: Jun. 25, 2020

(65) Prior Publication Data
US 2022/0060687 A1 Feb. 24, 2022

Related U.S. Application Data

(60) Provisional application No. 62/781,532, filed on Dec. 18, 2018.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/573* (2014.11); *H04N 19/577* (2014.11)

(58) Field of Classification Search
CPC .. H04N 19/105; H04N 19/139; H04N 19/176; H04N 19/573; H04N 19/577
See application file for complete search history.

(56) References Cited

U.S. PATENT DOCUMENTS

| | | | |
|---|---|---|---|
| 2011/0200107 A1* | 8/2011 | Ryu | H04N 19/162 |
| | | | 375/E7.125 |
| 2014/0044180 A1* | 2/2014 | Chen | H04N 19/30 |
| | | | 375/240.16 |

(Continued)

FOREIGN PATENT DOCUMENTS

| | | |
|---|---|---|
| KR | 10-2015-0052259 A | 5/2015 |
| KR | 10-2018-0061060 A | 6/2018 |
| KR | 10-1908249 B1 | 10/2018 |

OTHER PUBLICATIONS

Benjamin Bross, et al. "Versatile Video Coding (Draft 3)" Joint Video Experts Team (JVET) of ITU-T SG WP 3 and ISO/IEC JTC 1/SC 29/WG 11, 12th Meeting: Macao, CN Oct. 3-12, 2018. JVET-L1001-v6, Dec. 14, 2018

*Primary Examiner* — Jeremiah C Hallenbeck-Huber
(74) *Attorney, Agent, or Firm* — Bryan Cave Leighton Paisner LLP

(57) ABSTRACT

A video processing method according to an embodiment of the present disclosure includes obtaining motion information and bi-directional prediction weight information for inter prediction of a current block, deriving a prediction sample of the current block based on the motion information and the bi-directional prediction weight information, and updating an HMVP candidate list based on a history-based motion vector predictor (HMVP) candidate including the motion information and the bi-directional prediction weight (Continued)

information. The motion information includes a first reference index and a first motion vector related to a first reference picture and a second reference index and a second motion vector related to a second reference picture. The bi-directional prediction weight information may be used to derive a first weight value applied to a first prediction sample from the first reference picture and a second weight value applied to a second prediction sample from the second reference picture.

15 Claims, 22 Drawing Sheets

(51) Int. Cl.
*H04N 19/176* (2014.01)
*H04N 19/573* (2014.01)
*H04N 19/577* (2014.01)

(56) References Cited

U.S. PATENT DOCUMENTS

| | | | |
|---|---|---|---|
| 2014/0105302 A1* | 4/2014 | Takehara | H04N 19/521 |
| | | | 375/240.15 |
| 2014/0192884 A1 | 7/2014 | Laroche et al. | |
| 2014/0247884 A1* | 9/2014 | Chuang | H04N 19/52 |
| | | | 375/240.16 |
| 2014/0321547 A1* | 10/2014 | Takehara | H04N 19/159 |
| | | | 375/240.16 |
| 2015/0281726 A1* | 10/2015 | Chono | H04N 19/147 |
| | | | 375/240.16 |
| 2016/0366416 A1* | 12/2016 | Liu | G06T 7/246 |
| 2017/0332095 A1* | 11/2017 | Zou | H04N 19/537 |
| 2019/0028703 A1* | 1/2019 | Tamse | H04N 19/176 |
| 2019/0246118 A1* | 8/2019 | Ye | H04N 19/176 |
| 2020/0186818 A1* | 6/2020 | Li | H04N 19/577 |
| 2020/0204807 A1* | 6/2020 | Ye | H04N 19/159 |
| 2020/0296388 A1* | 9/2020 | Bordes | H04N 19/82 |
| 2021/0243470 A1* | 8/2021 | Solovyev | H04N 19/52 |
| 2022/0060687 A1* | 2/2022 | Jang | H04N 19/70 |

* cited by examiner

[FIG. 1]
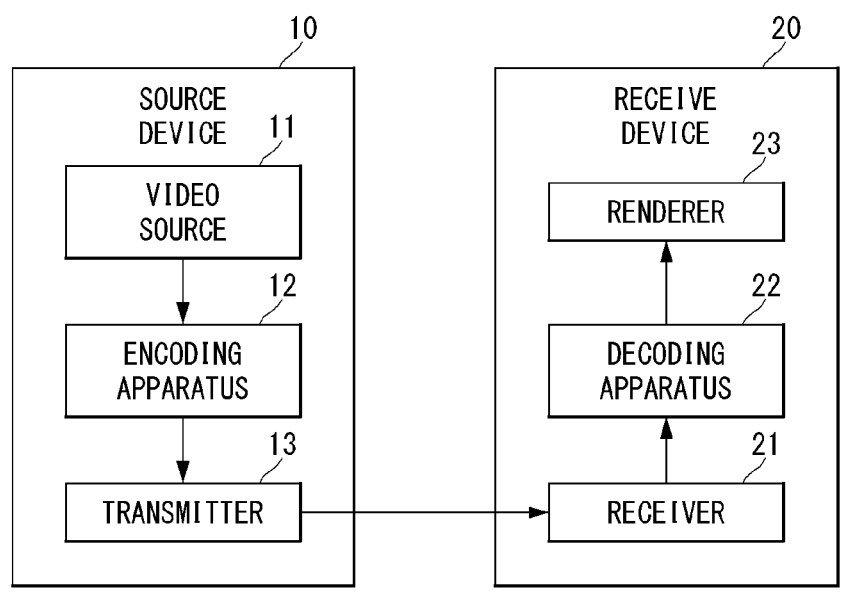

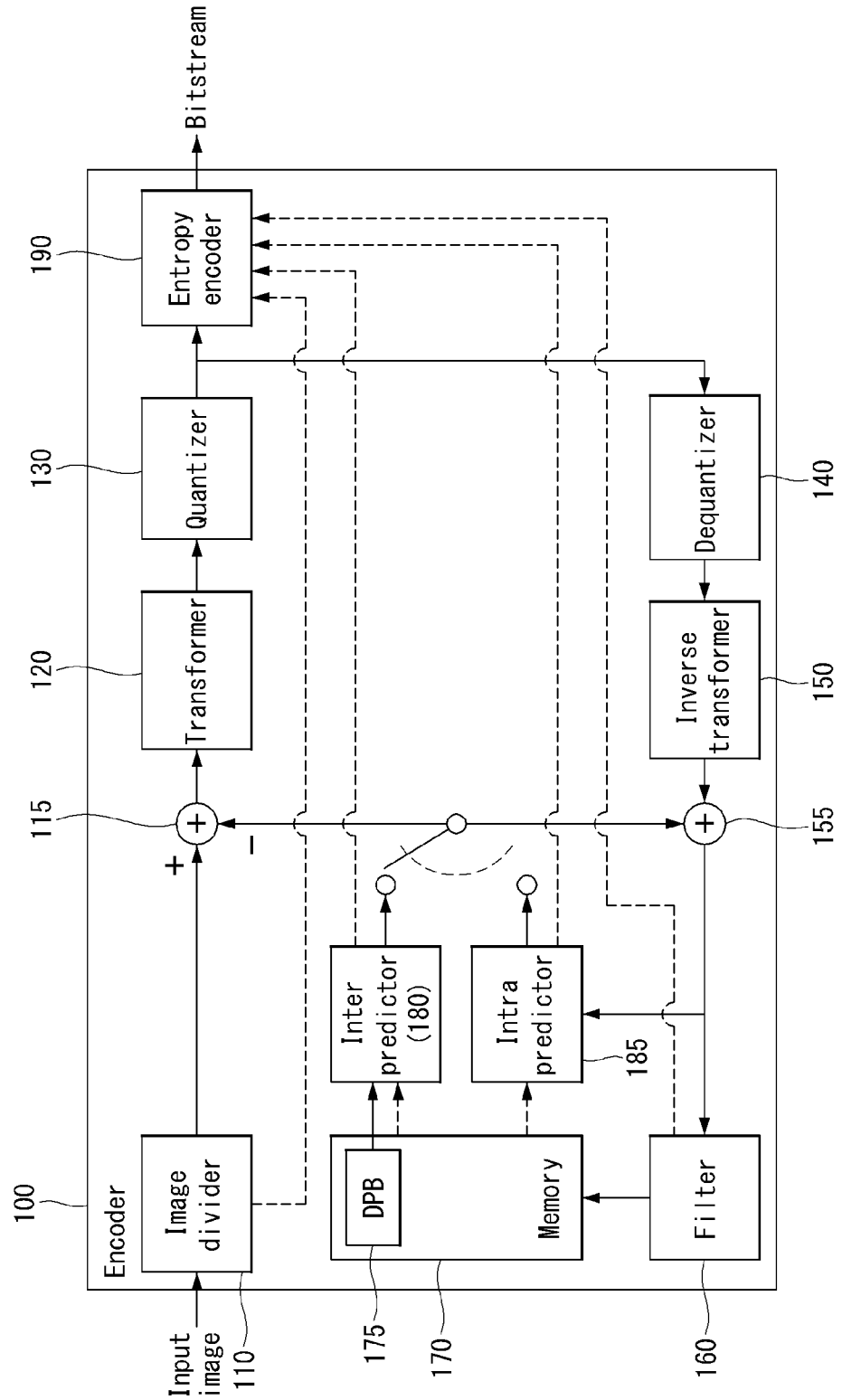
[FIG. 2]

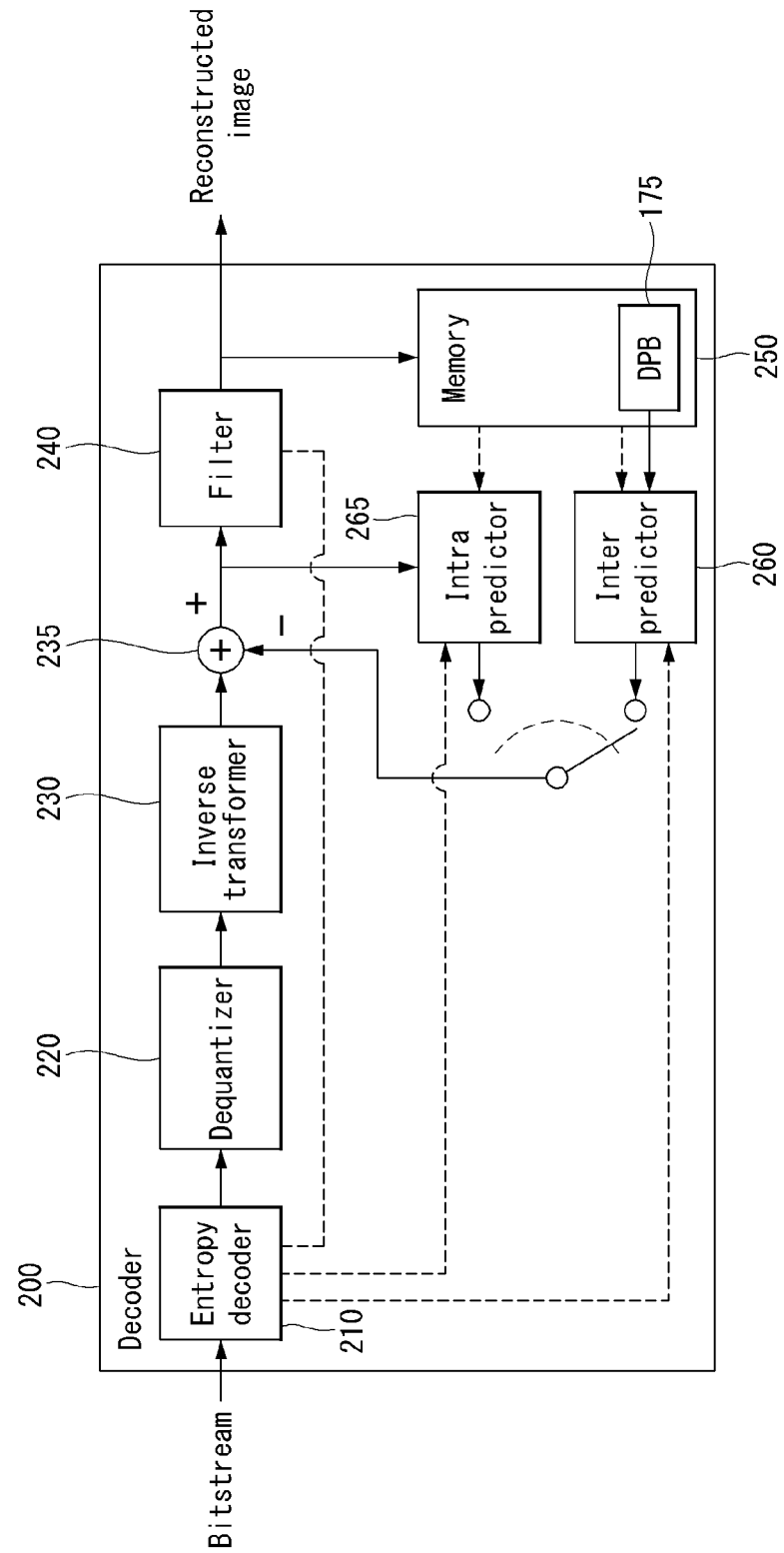
[FIG. 3]

[FIG. 4]
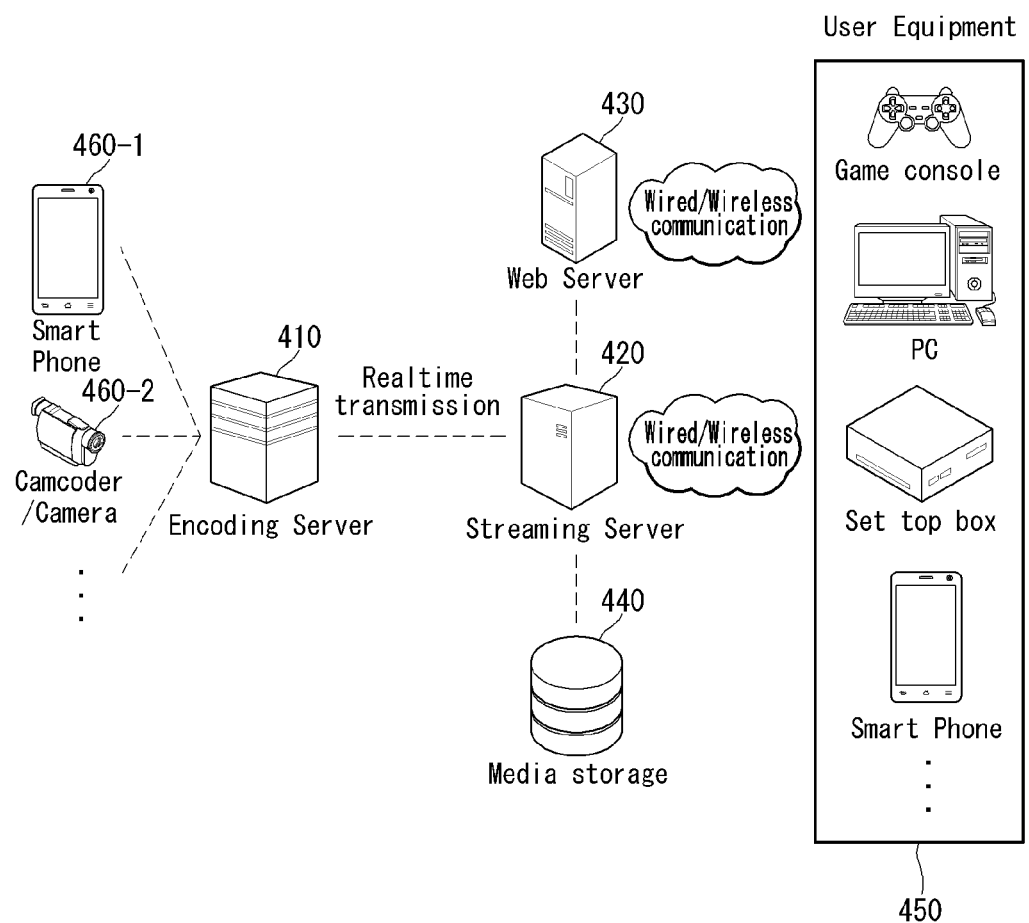
[FIG. 5]
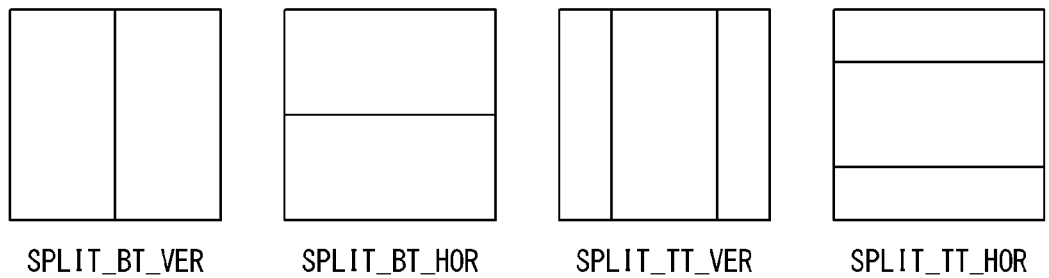

[FIG. 6]
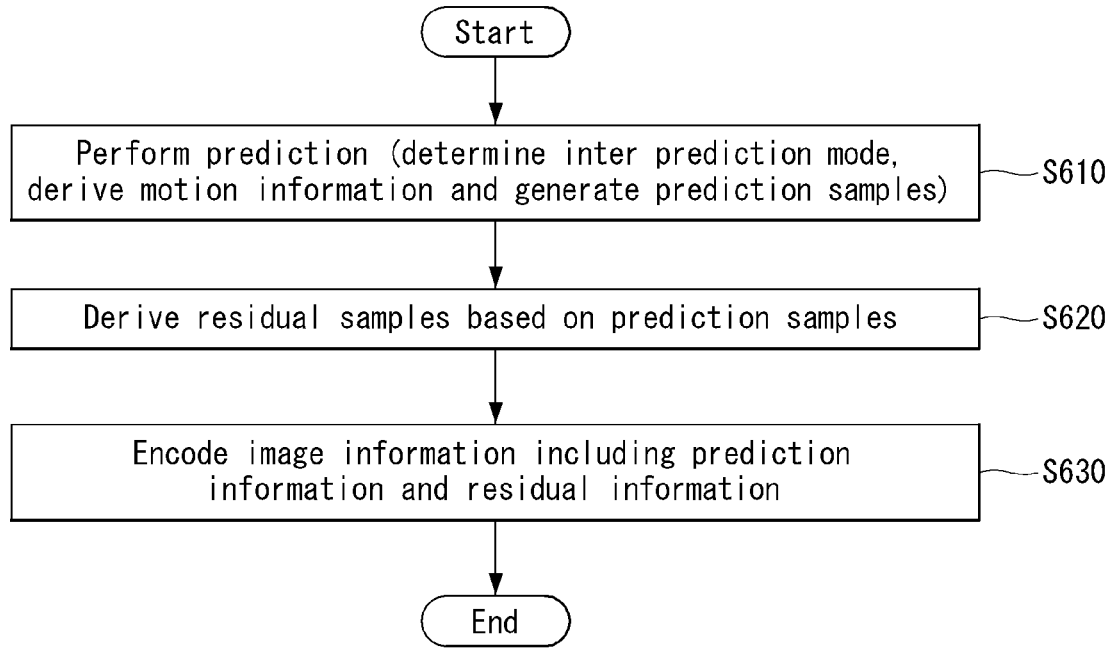
[FIG. 7]
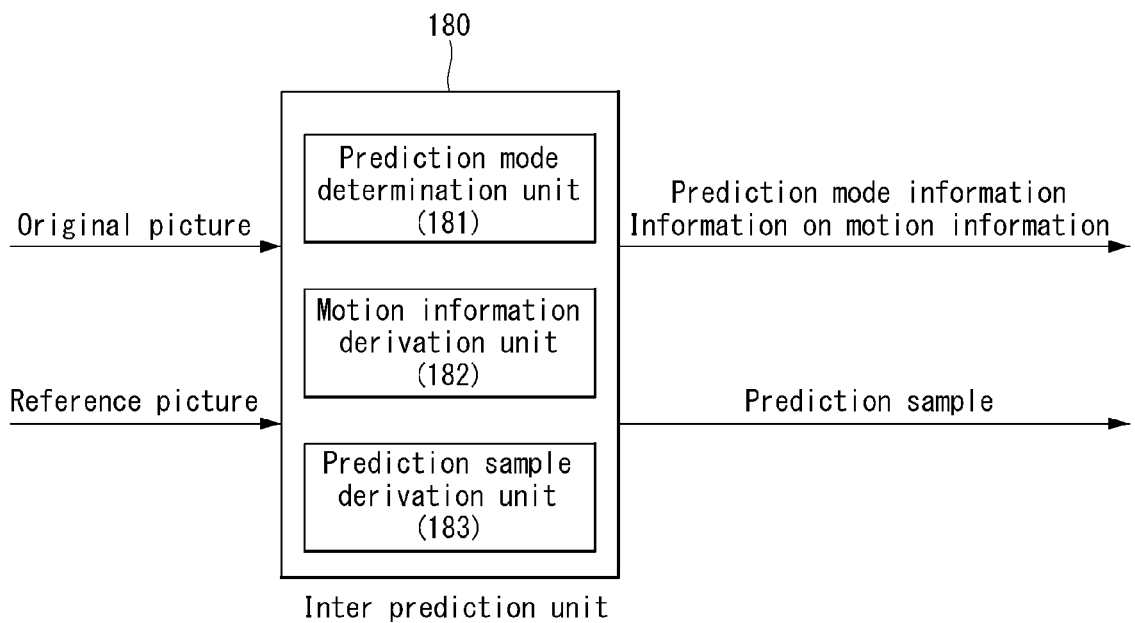

[FIG. 8]
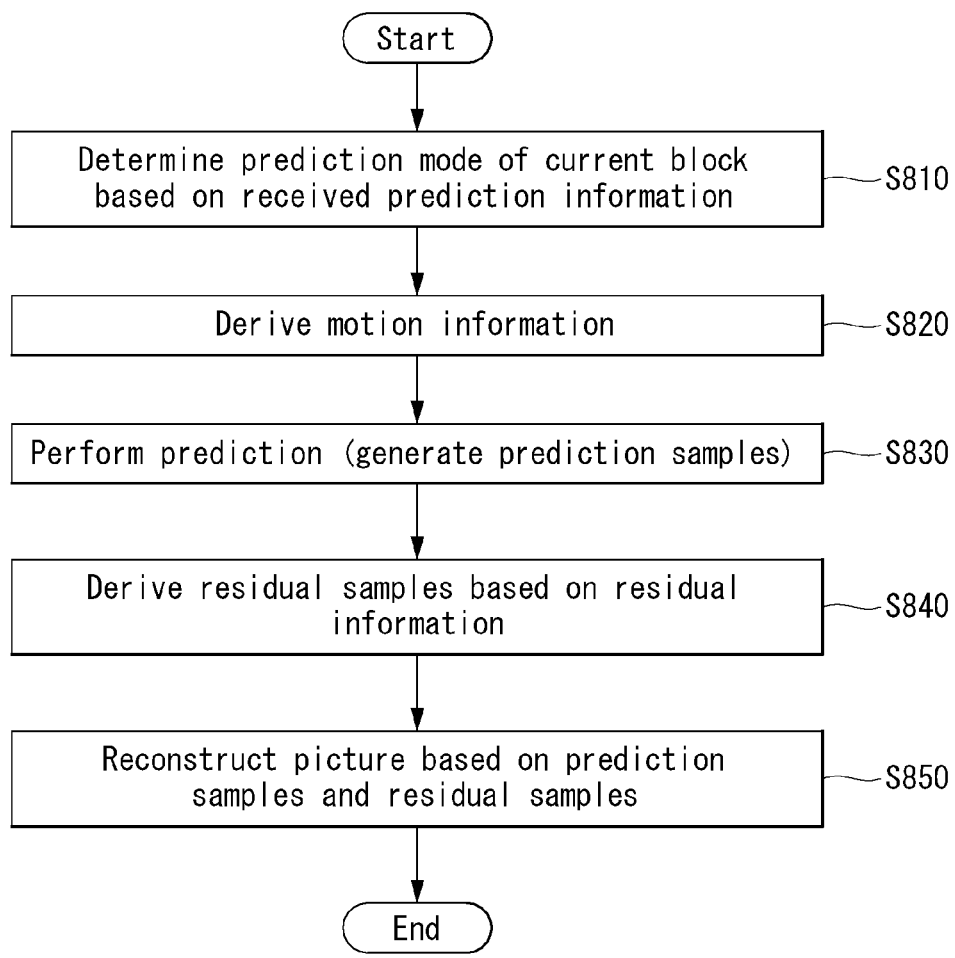

[FIG. 9]
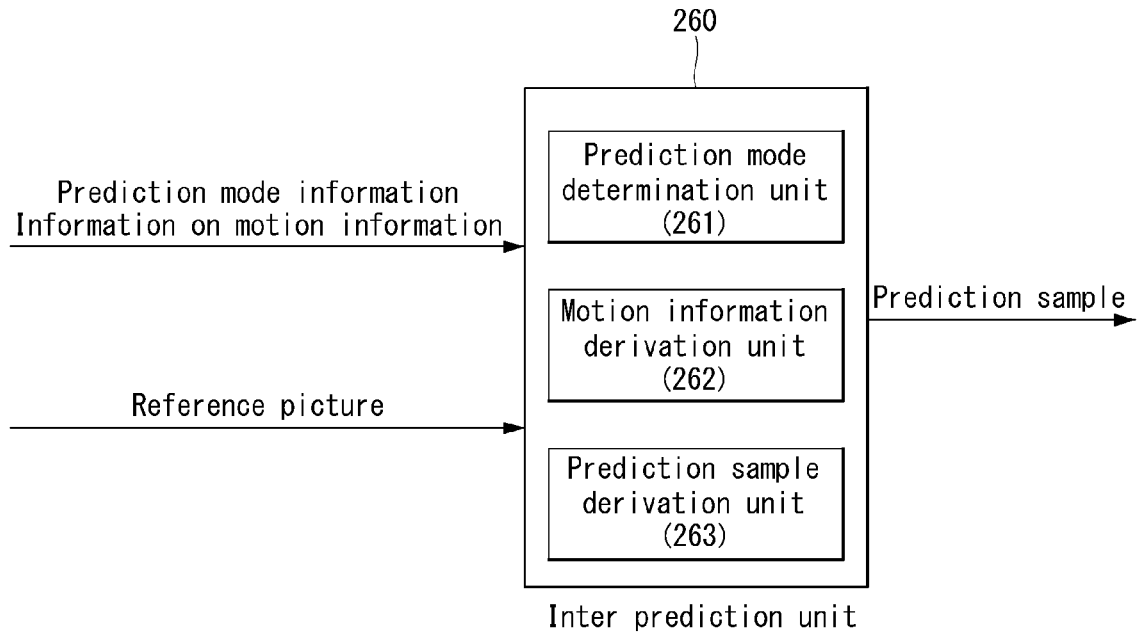
[FIG. 10]
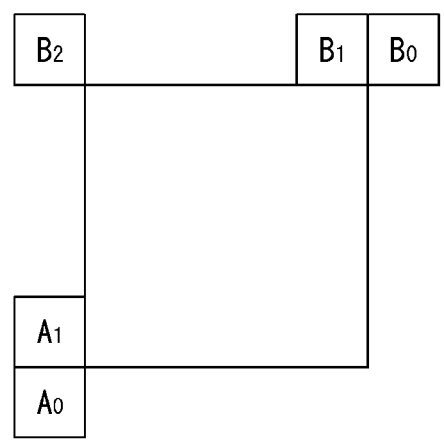

[FIG. 11]
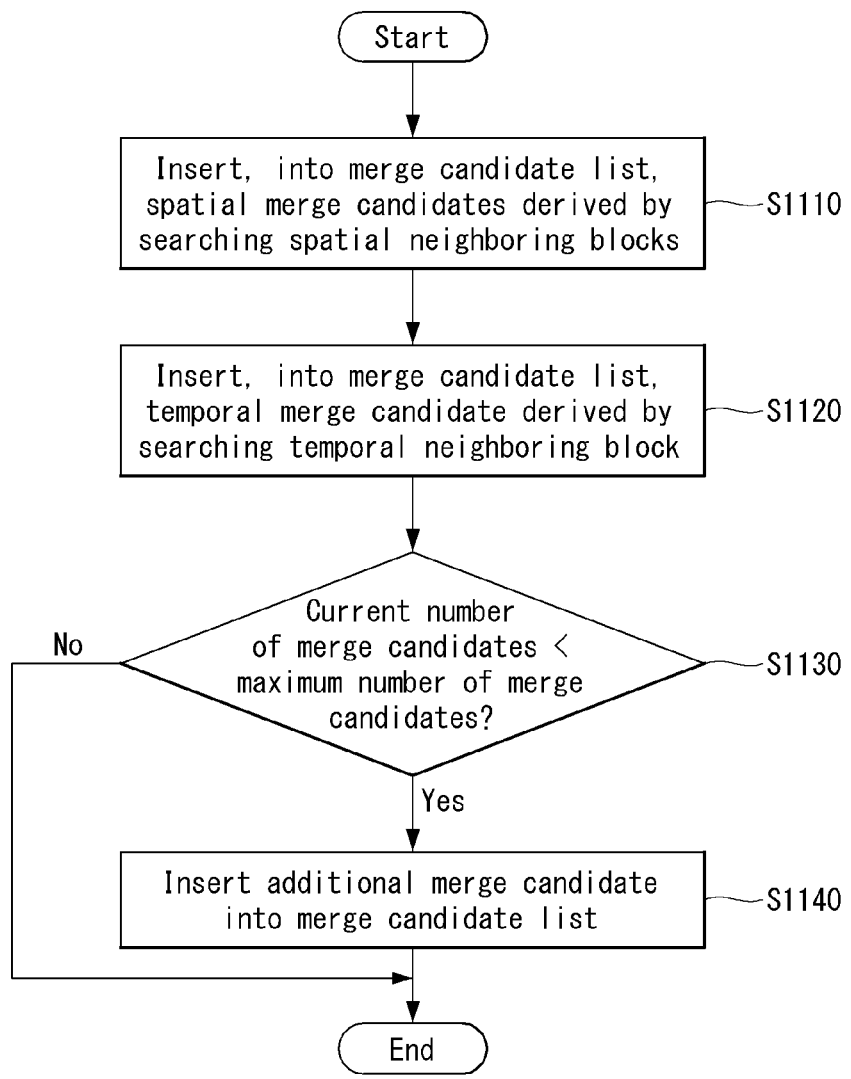

[FIG. 12]
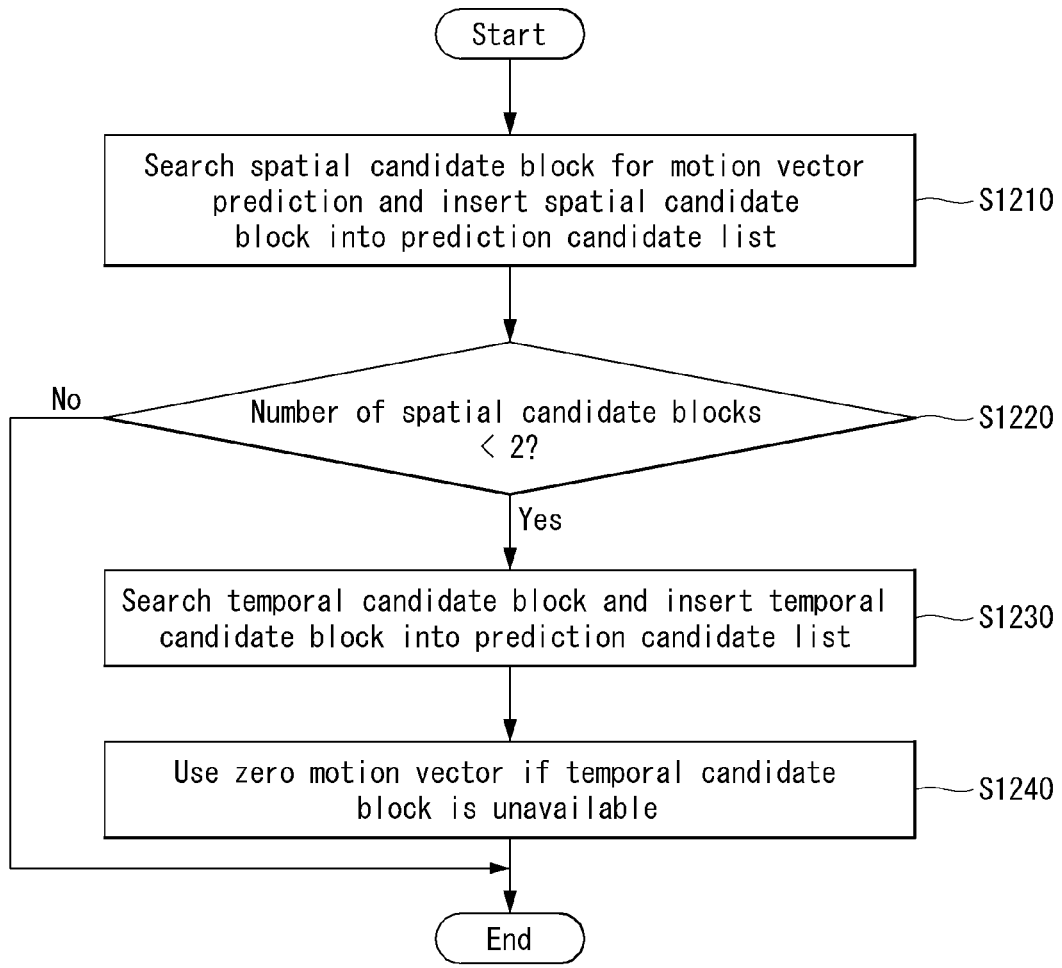
[FIG. 13]
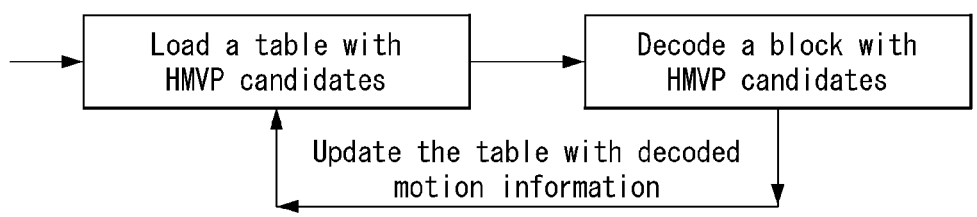

[FIG. 14a]
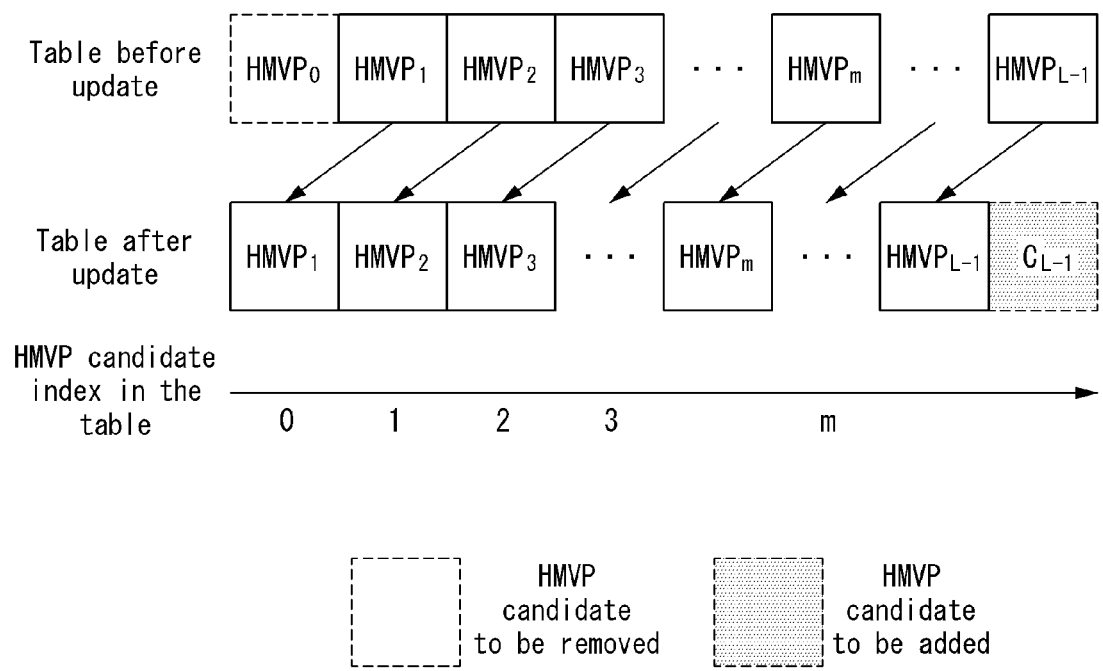

[FIG. 14b]
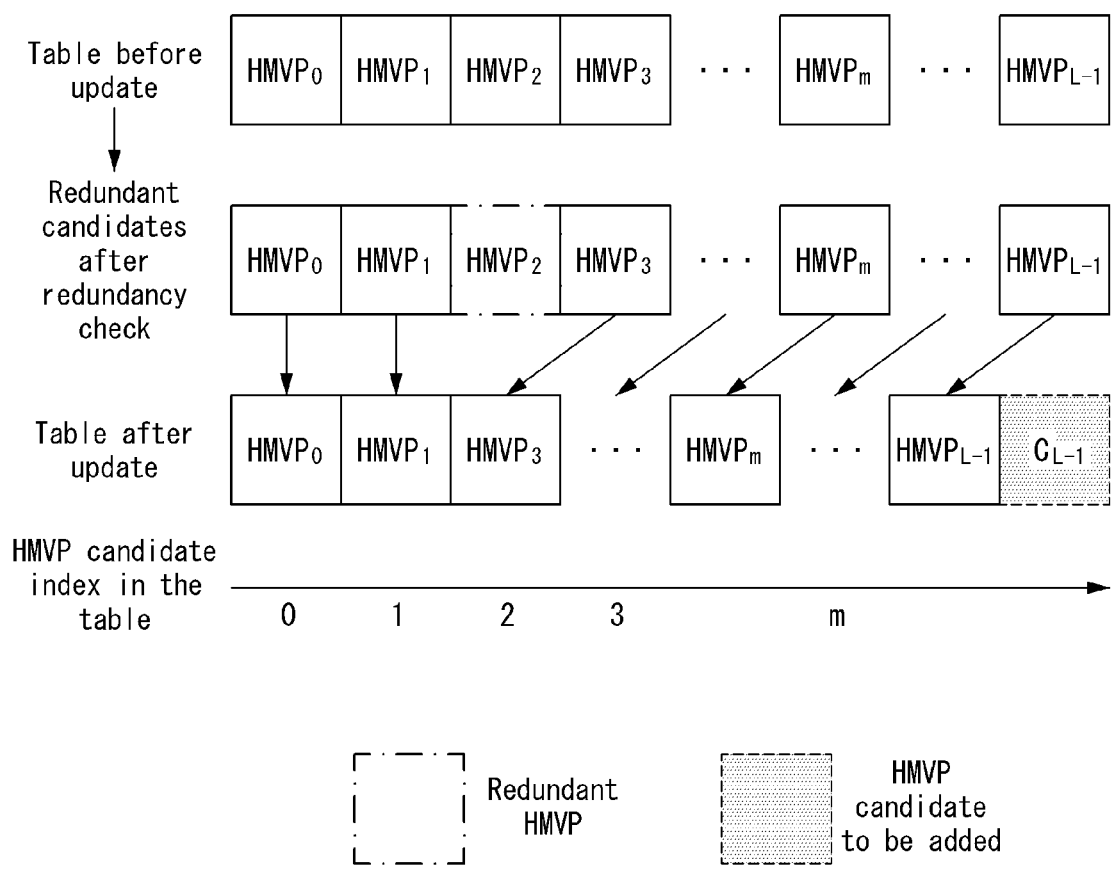

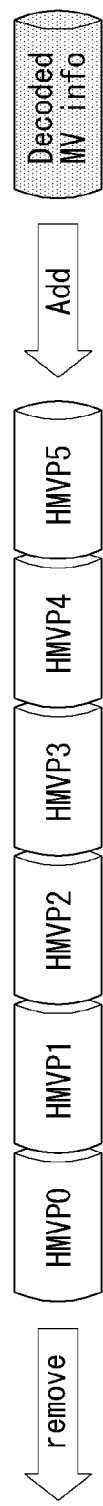
[FIG. 15a]

[FIG. 15b]

[FIG. 16]
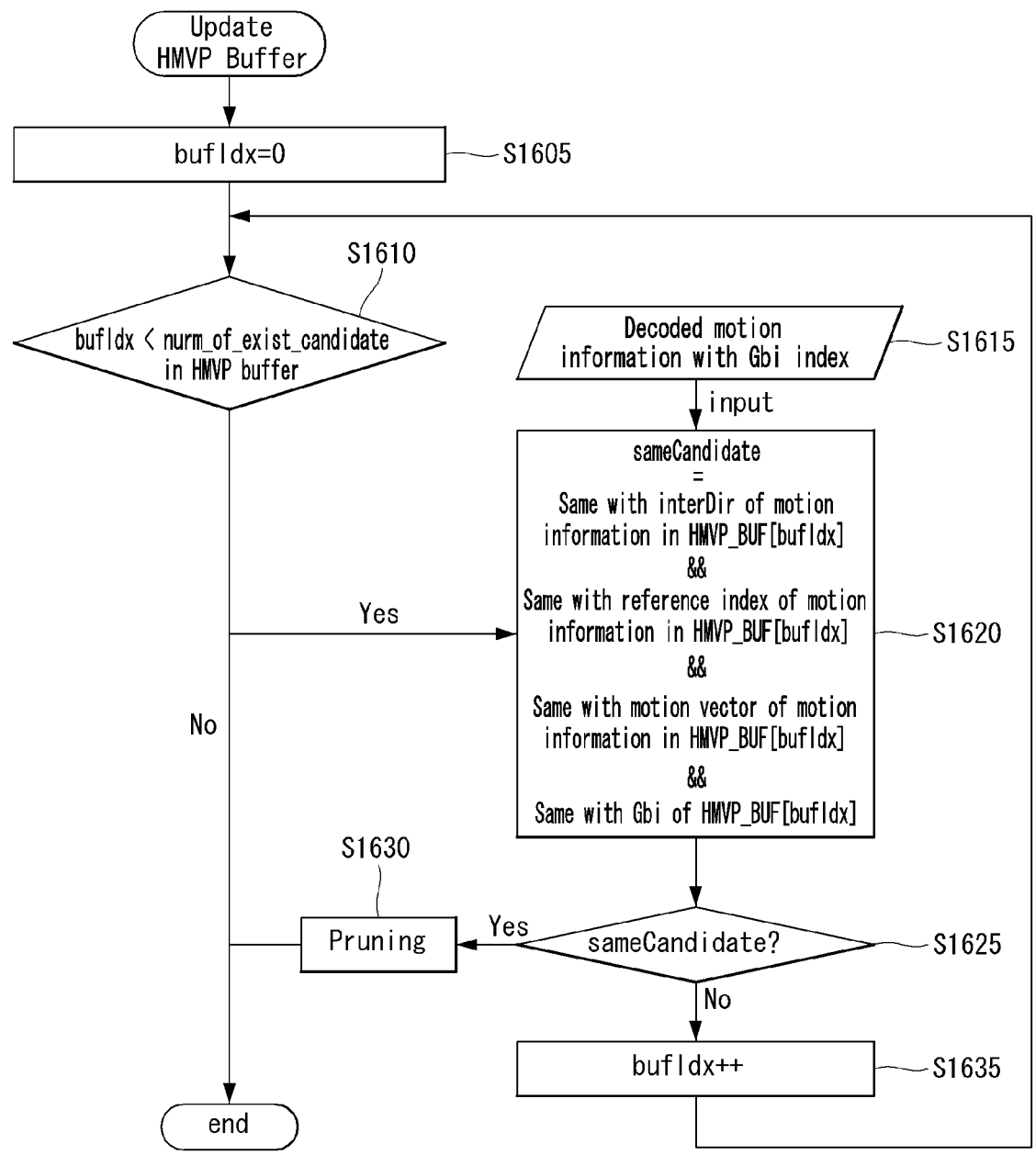

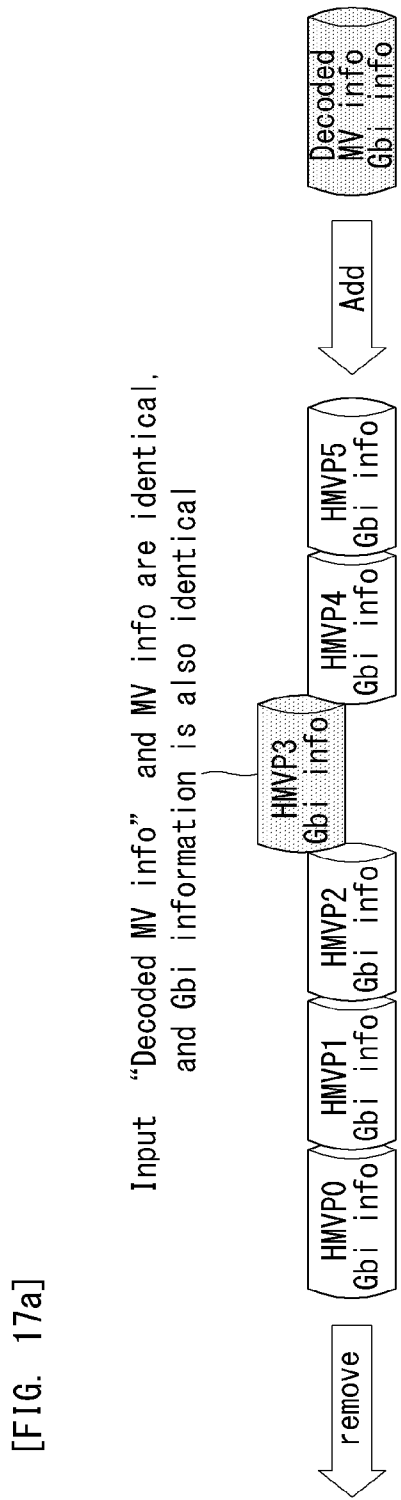
[FIG. 17a]

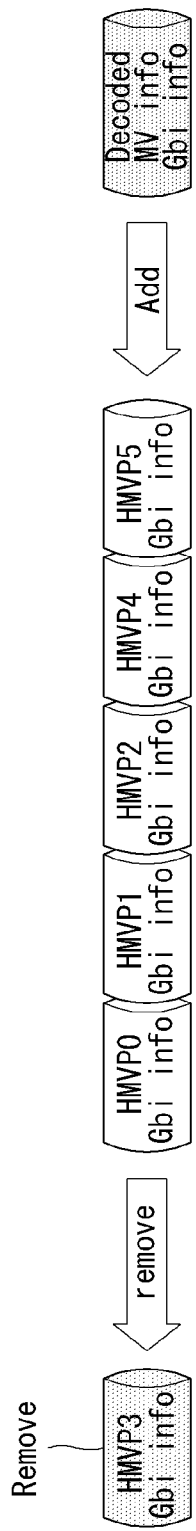
[FIG. 17b]

[FIG. 18a]
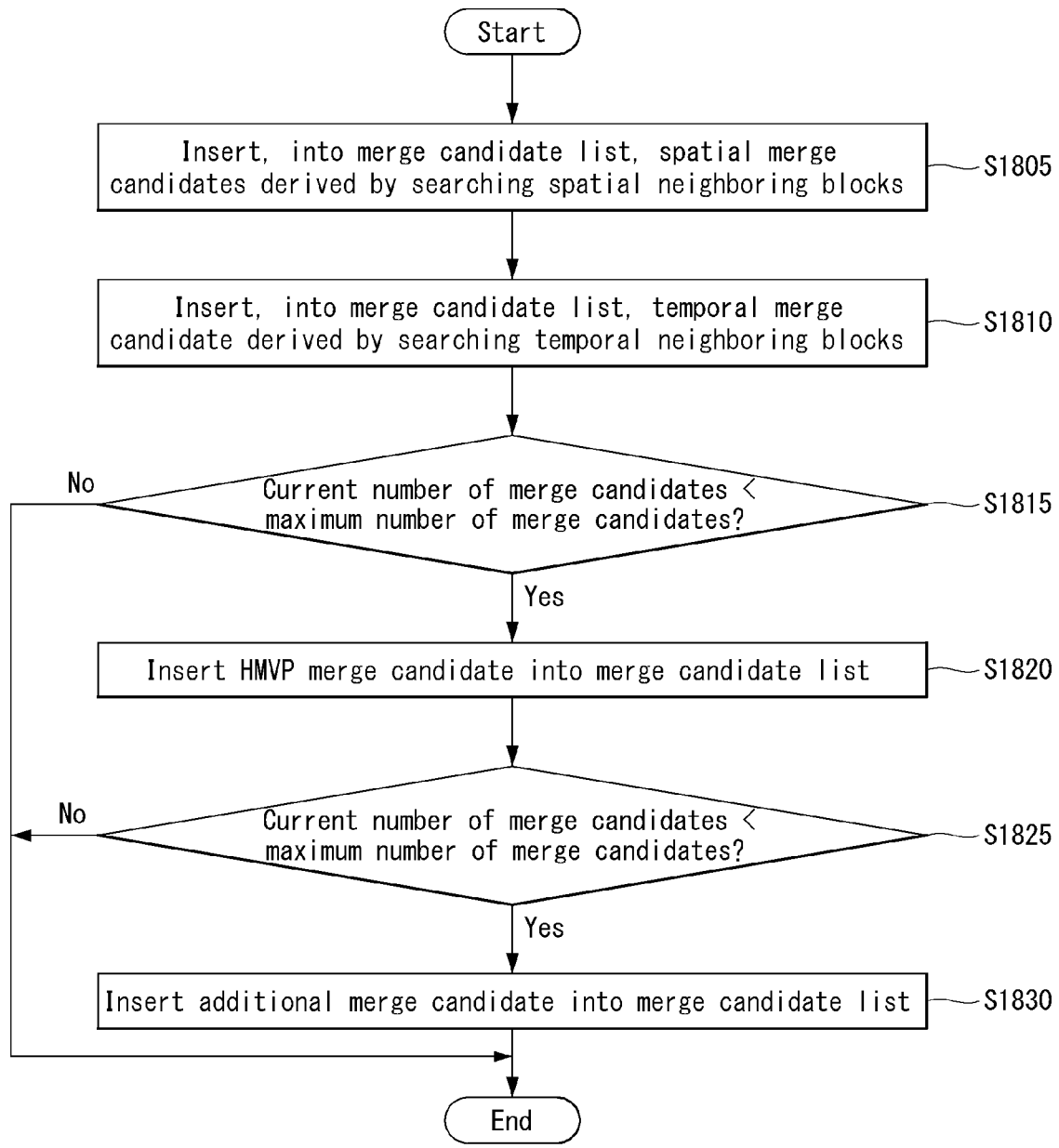

[FIG. 18b]
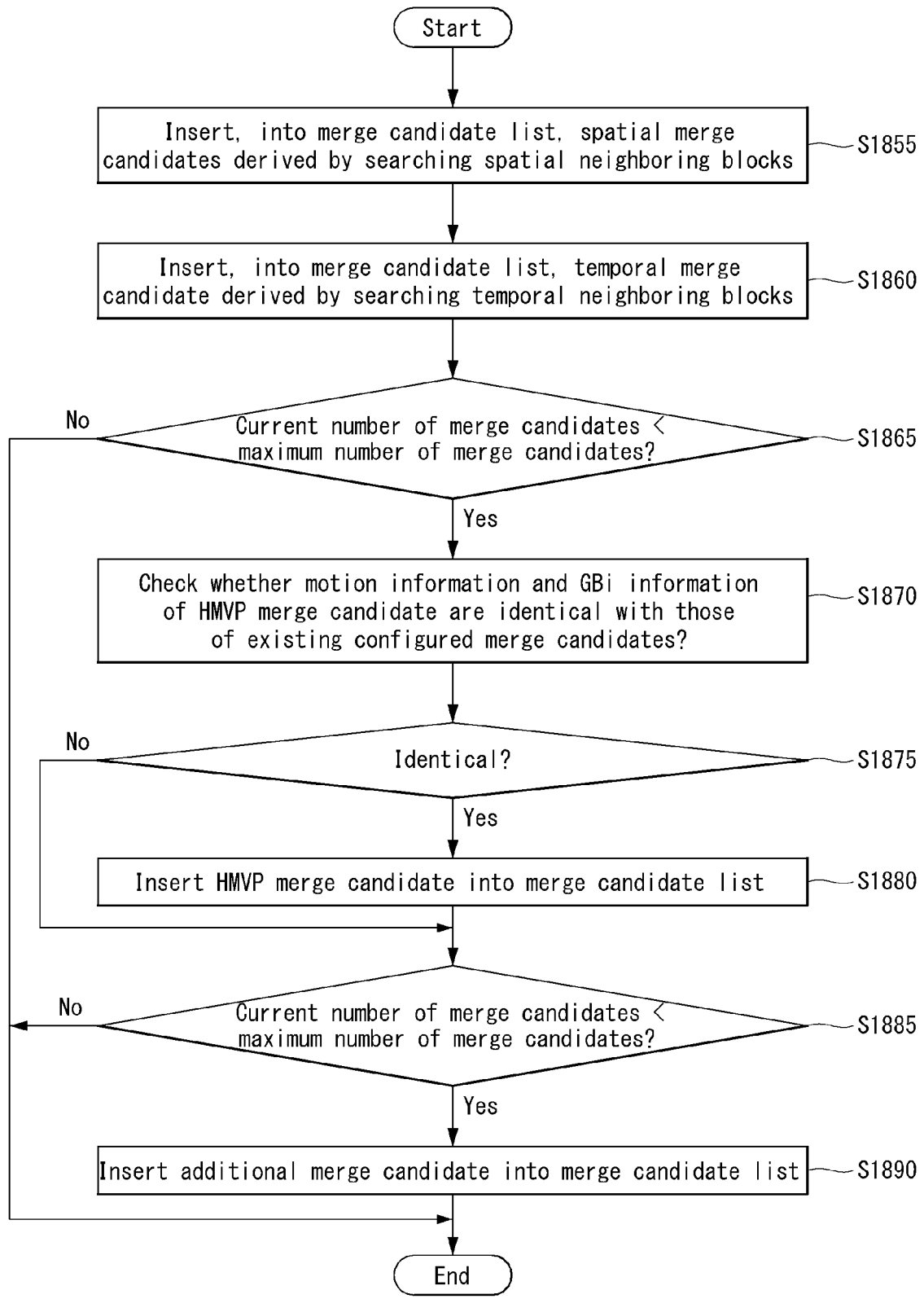

[FIG. 19a]
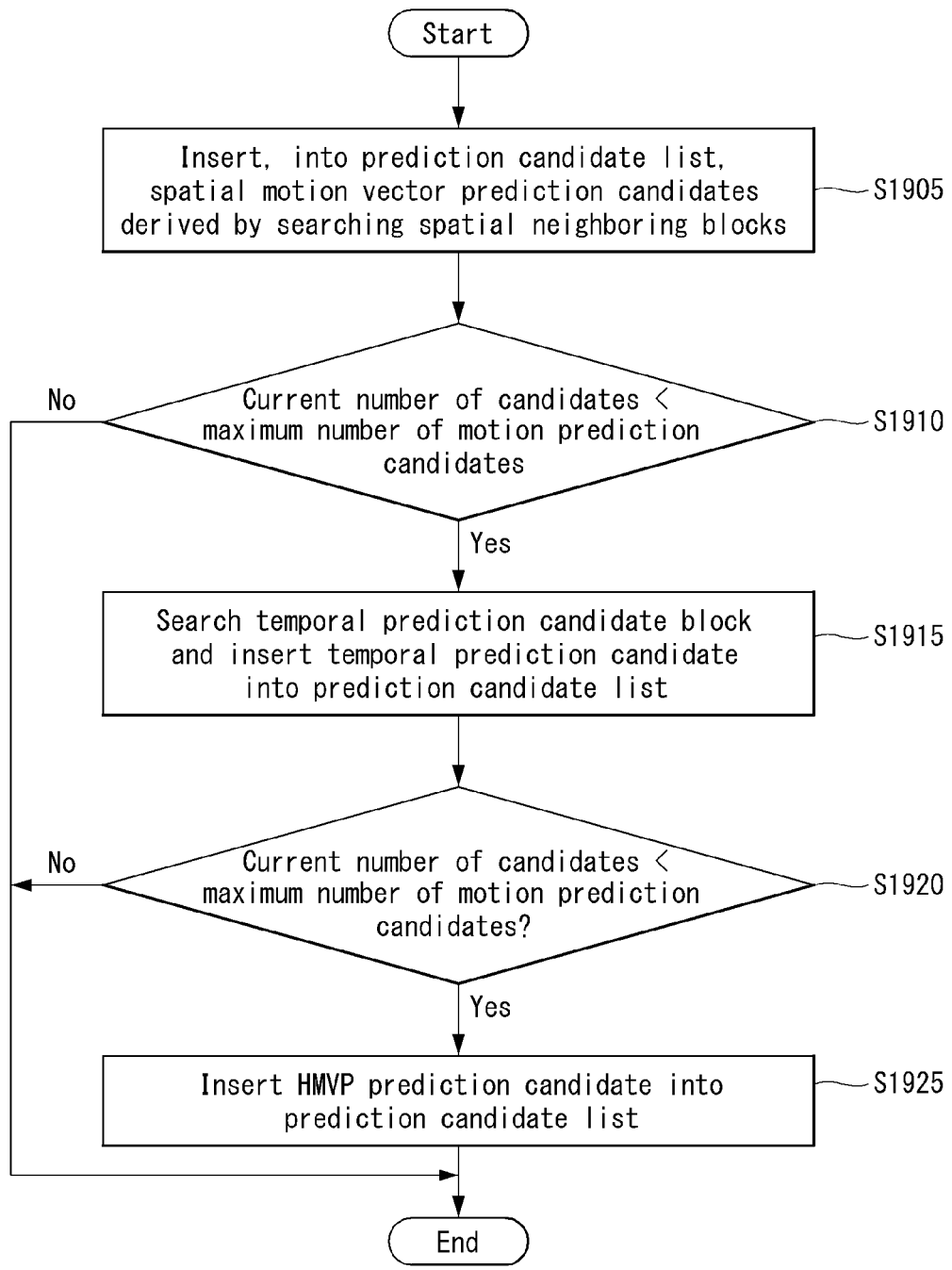

[FIG. 19b]
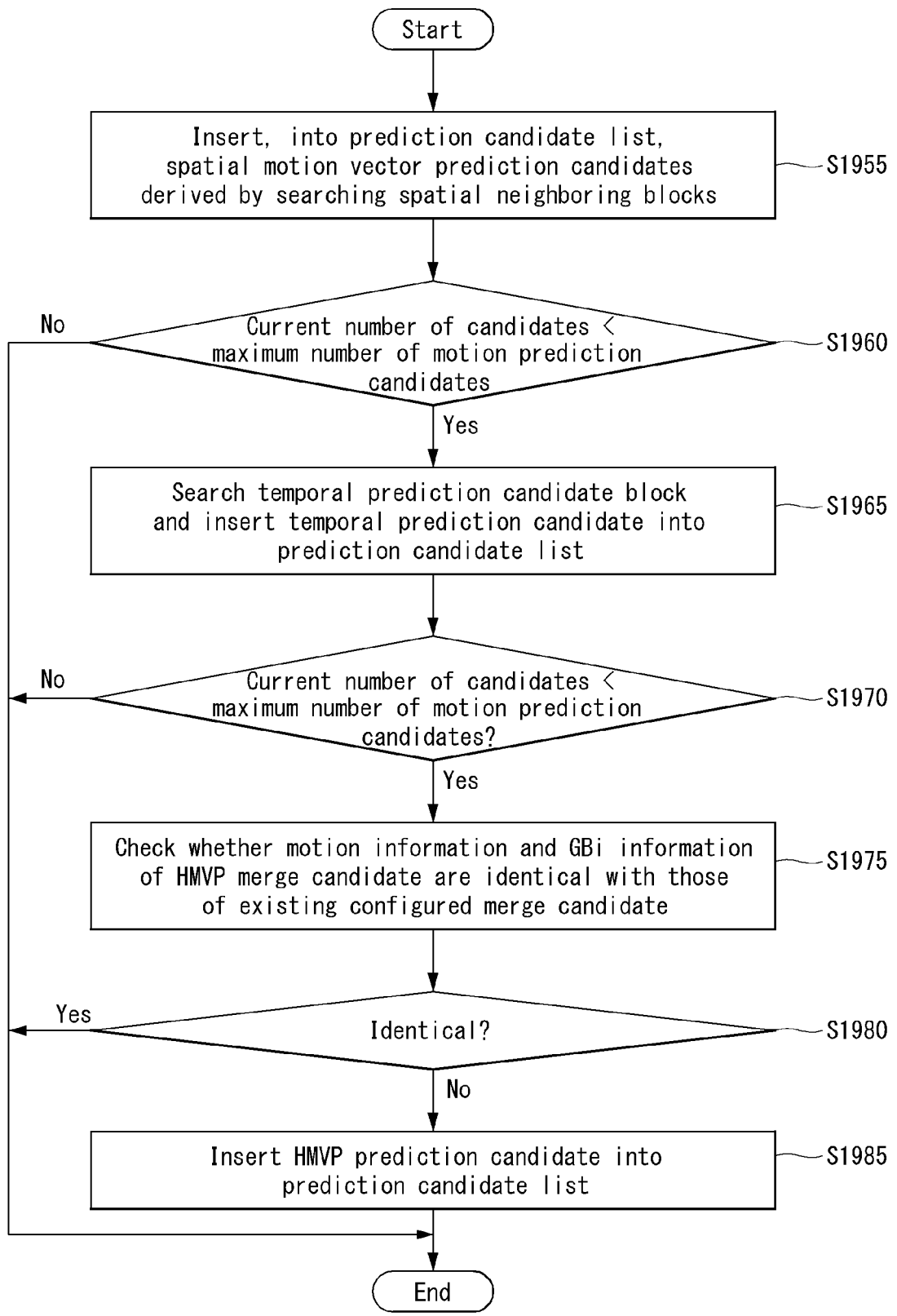

[FIG. 20]
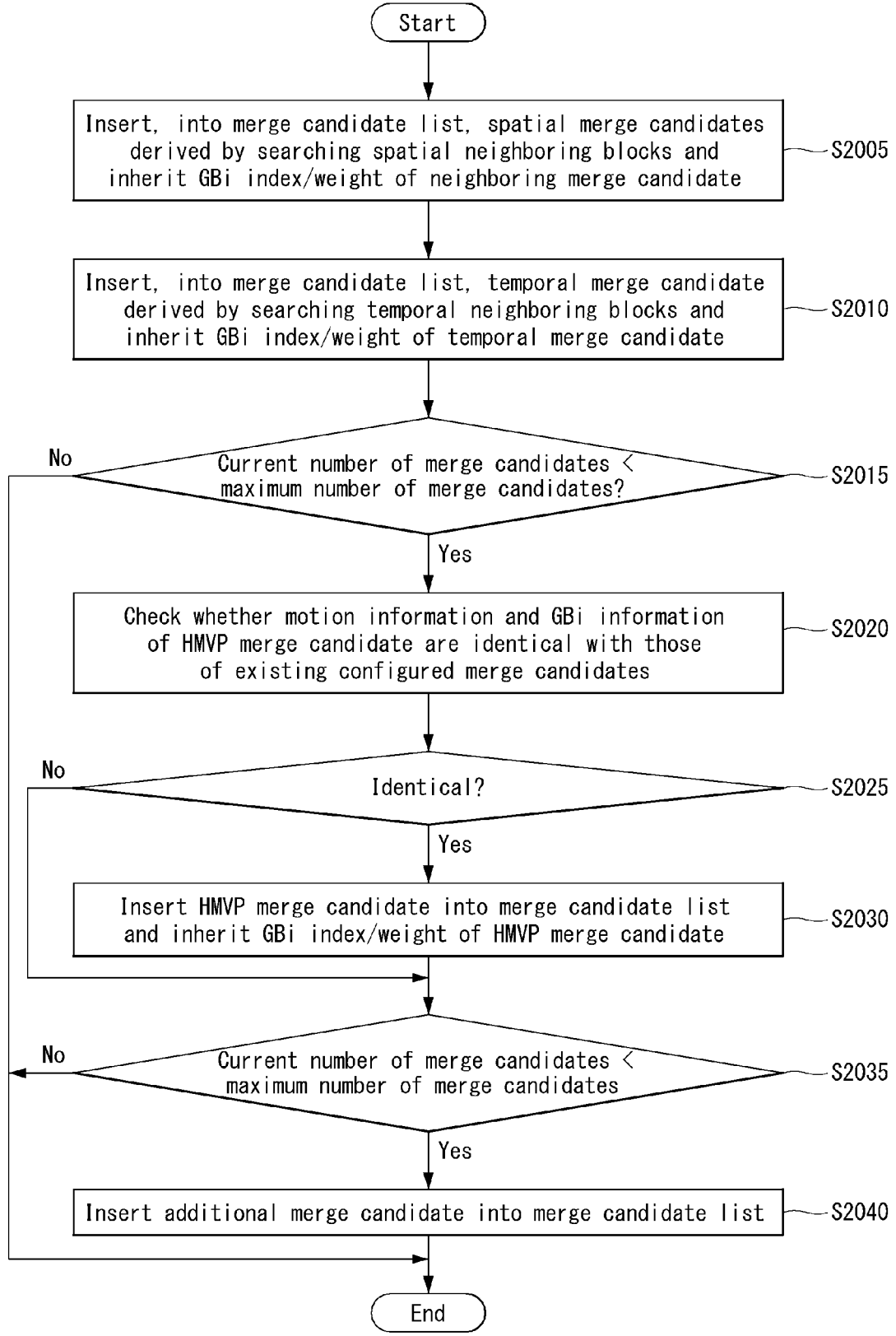

[FIG. 21]
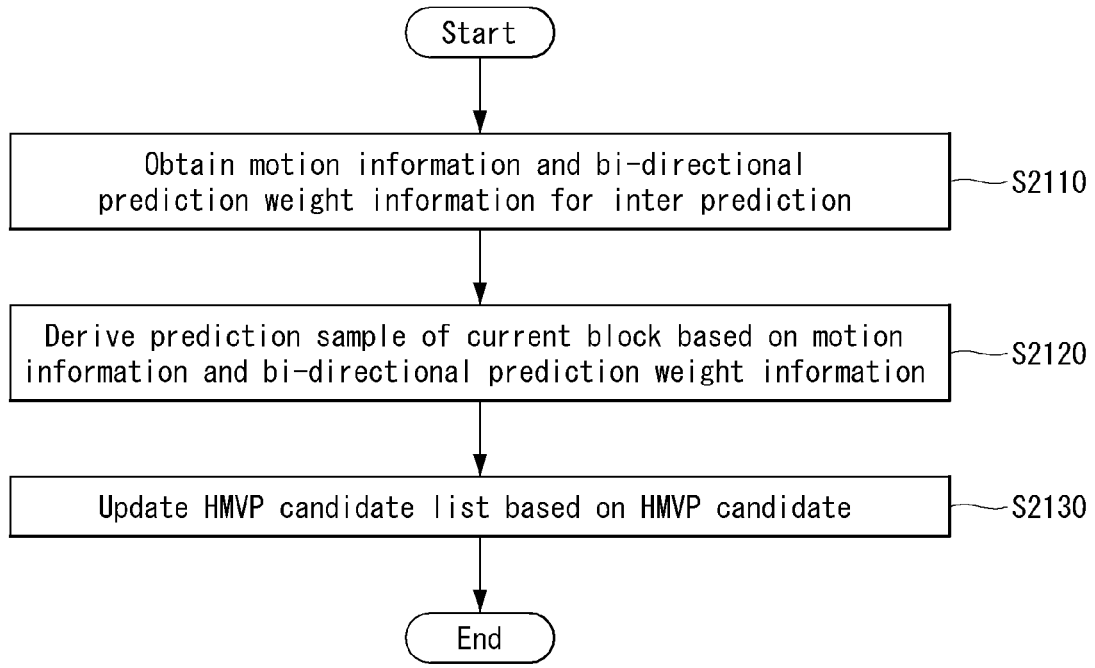
[FIG. 22]
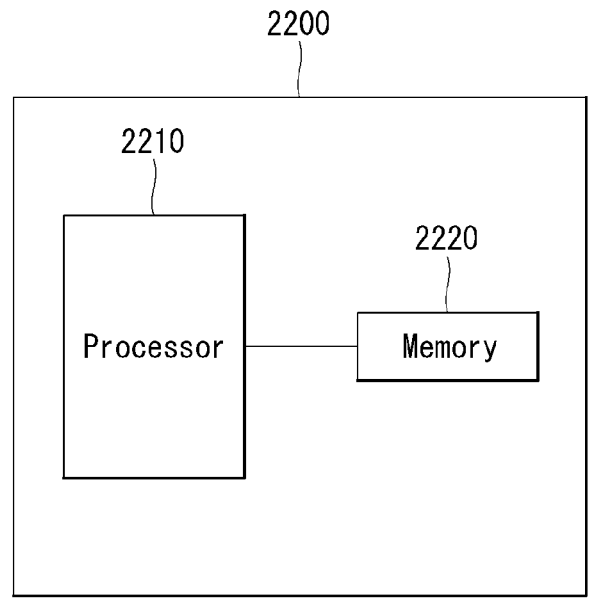

METHOD AND APPARATUS FOR PROCESSING VIDEO DATA

CROSS-REFERENCE TO RELATED APPLICATIONS

This application is the National Stage filing under 35 U.S.C. 371 of International Application No. PCT/KR2019/017983, filed on Dec. 18, 2019, which claims the benefit of U.S. Provisional Application No. 62/781,532, filed on Dec. 18, 2018, the contents of which are all hereby incorporated by reference herein in their entirety.

TECHNICAL FIELD

Embodiments of the disclosure relate to methods and apparatuses for processing video data, and particularly, to methods and apparatuses for encoding or decoding video data by using inter prediction.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding. Particularly, a technique for performing compression encoding on a picture is referred to as video image compression.

Next-generation video content is supposed to have characteristics of high spatial resolution, a high frame rate, and high dimensionality of scene representation. Processing such content will require a drastic increase in memory storage, a memory access rate and processing power.

Accordingly, it is required to design a coding tool for efficiently processing next-generation video content. Particularly, video codec standards after the high efficiency video coding (HEVC) standard require more efficient prediction techniques.

DISCLOSURE

Technical Problem

Embodiments of the present disclosure provide a video data processing method and apparatus for configuring and updating a history-based motion vector prediction (HMVP) list by considering generalized bi-prediction (GBi) information in inter prediction.

Technical objects to be achieved in an embodiment of the present disclosure are not limited to the aforementioned technical object, and other technical objects not described above may be evidently understood by a person having ordinary knowledge in the art to which the present disclosure pertains from the following description.

Technical Solution

A video data processing method according to an embodiment of the present disclosure includes obtaining motion information and bi-directional prediction weight information for inter prediction of a current block, deriving a prediction sample of the current block based on the motion information and the bi-directional prediction weight information, and updating an HMVP candidate list based on an HMVP candidate including the motion information and the bi-directional prediction weight information. The motion information may include a first reference index and a first motion vector related to a first reference picture, and a second reference index and a second motion vector related to a second reference picture. The bi-directional prediction weight information may be used to derive a first weight value applied to a first prediction sample from the first reference picture and a second weight value applied to a second prediction sample from the second reference picture.

In one embodiment, updating the HMVP candidate list may include updating the HMVP candidate list based on whether a candidate identical with the HMVP candidate is present in the HMVP candidate list.

In one embodiment, updating the HMVP candidate list may include checking a index of the HMVP candidate list, determining whether the index is smaller than a number of candidates within the HMVP candidate list, determining whether a candidate corresponding to the index in the HMVP candidate list and the HMVP candidate are identical when the index is smaller than the number of candidates within the HMVP candidate list, performing pruning for adding the HMVP candidate to the HMVP candidate list by removing the candidate corresponding to the index when the candidate corresponding to the index and the HMVP candidate are identical, and increasing the index of the HMVP candidate list, and repeatedly performing an operation of determining whether the increased index is smaller than the number of candidates and whether the HMVP candidate and a candidate corresponding to the increased index are identical, when the candidate corresponding to the index and the HMVP candidate are different.

In one embodiment, determining whether the candidate corresponding to the index in the HMVP candidate list and the HMVP candidate are identical may include determining whether prediction directions, reference indices, motion vectors, and bi-directional prediction weight indices of the candidate corresponding to the index and the HMVP candidate are identical.

In one embodiment, obtaining the motion information and the bi-directional prediction weight information includes configuring a merge candidate list and determining a merge candidate indicated by a merge index in the merge candidate list. Configuring the merge candidate list may include adding a spatial merge candidate and a temporal merge candidate of the current block to the merge candidate list and modifying the merge candidate list by using the HMVP candidate list when a number of merge candidates included in the merge candidate list is smaller than a preset number of candidates.

In one embodiment, modifying the merge candidate list may include determining whether an HMVP prediction candidate included in the HMVP candidate list is identical with a merge candidate included in the merge candidate list and adding the HMVP prediction candidate to the merge candidate list when the HMVP prediction candidate included in the HMVP candidate list is different from the merge candidate included in the merge candidate list.

In one embodiment, adding the spatial merge candidate and the temporal merge candidate to the merge candidate list may include performing search for the temporal merge candidate after search for the spatial merge candidate.

A video data processing apparatus for according to another embodiment of the present disclosure includes a memory storing the video data and a processor coupled to the memory. The processor may be configured to obtain motion information and bi-directional prediction weight information for inter prediction of a current block, derive a prediction sample of the current block based on the motion information and the bi-directional prediction weight information, and update an HMVP candidate list based on an HMVP candidate including the motion information and the bi-directional prediction weight information. The motion information may include a first reference index and a first motion vector related to a first reference picture, and a second reference index and a second motion vector related to a second reference picture. The bi-directional prediction weight information may be used to derive a first weight value applied to a first prediction sample from the first reference picture and a second weight value applied to a second prediction sample from the second reference picture.

Another embodiment of the present disclosure provides a non-transitory computer-executable component in which a computer-executable component configured to be executed in one or more processors of a computing device is stored. The computer-executable component may be configured to obtain motion information and bi-directional prediction weight information for inter prediction of a current block, derive a prediction sample of the current block based on the motion information and the bi-directional prediction weight information, and update an HMVP candidate list based on an HMVP candidate including the motion information and the bi-directional prediction weight information. The motion information may include a first reference index and a first motion vector related to a first reference picture, and a second reference index and a second motion vector related to a second reference picture. The bi-directional prediction weight information may be used to derive a first weight value applied to a first prediction sample from the first reference picture and a second weight value applied to a second prediction sample from the second reference picture.

Advantageous Effects

According to an embodiment of the present disclosure, a history-based motion vector prediction (HMVP) list can be configured and updated along with information on generalized bi-prediction (GBi) together with motion information.

Effects which may be obtained in an embodiment of the present disclosure are not limited to the aforementioned effects, and other technical effects not described above may be evidently understood by a person having ordinary knowledge in the art to which the present disclosure pertains from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of a video coding system according to an embodiment of the disclosure.

FIG. 2 is an embodiment to which the disclosure is applied, and is a schematic block diagram of an encoding apparatus for encoding a video/image signal.

FIG. 3 is an embodiment to which the disclosure is applied, and is a schematic block diagram of a decoding apparatus for decoding a video/image signal.

FIG. 4 shows an example of a structural diagram of a content streaming system according to an embodiment of the disclosure.

FIG. 5 illustrates an example of multi-type tree split modes according to an embodiment of the present disclosure.

FIG. 6 illustrates an example of a flowchart for video/image encoding based on inter prediction according to an embodiment of the present disclosure.

FIG. 7 illustrates an example of a block diagram of an inter prediction unit within the encoding apparatus according to an embodiment of the present disclosure.

FIG. 8 illustrates an example of a flowchart for video/image decoding based on inter prediction according to an embodiment of the present disclosure.

FIG. 9 illustrates an example of a block diagram of an inter prediction unit within the decoding apparatus according to an embodiment of the present disclosure.

FIG. 10 illustrates an example of spatial neighboring blocks for inter prediction according to an embodiment of the present disclosure.

FIG. 11 illustrates an example of a flowchart for configuring a merge candidate list according to an embodiment of the present disclosure.

FIG. 12 illustrates an example of a flowchart for configuring a motion vector predictor candidate list according to an embodiment of the present disclosure.

FIG. 13 illustrates an example of a decoding flowchart to which an HMVP method according to an embodiment of the present disclosure is applied.

FIGS. 14a and 14b illustrate examples of a method for updating a table in an HMVP method according to an embodiment of the present disclosure.

FIGS. 15a and 15b illustrate examples of a method for updating an HMVP buffer according to an embodiment of the present disclosure.

FIG. 16 illustrates an example of a flowchart for updating an HMVP buffer according to an embodiment of the present disclosure.

FIGS. 17a to 17b illustrate examples of a method for updating an HMVP buffer by considering generalized bi-prediction (GBi) information according to an embodiment of the present disclosure.

FIGS. 18a and 18b illustrate examples of a flowchart for configuring a merge candidate list by considering an HMVP candidate according to an embodiment of the present disclosure.

FIGS. 19a and 19b illustrate examples of a flowchart for configuring a prediction candidate list by considering an HMVP candidate according to an embodiment of the present disclosure.

FIG. 20 illustrates an example of a flowchart for configuring a merge candidate list by considering an HVMP candidate using inherited GBi information according to an embodiment of the present disclosure.

FIG. 21 illustrates an example of a flowchart for processing video data according to an embodiment of the present disclosure.

FIG. 22 illustrates an example of a block diagram of an apparatus for processing video data according to an embodiment of the present disclosure.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art. In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a slice, a tile, a frame, a block, etc may be properly replaced and interpreted in each coding process.

Hereinafter, in this specification, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, a coefficient (a transform coefficient or a transform coefficient after a first order transformation) etc. are generally called a sample. Furthermore, to use a sample may mean to use a pixel value, a picture element value, a transform coefficient or the like.

FIG. 1 illustrates an example of a video coding system according to an embodiment of the disclosure.

The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and a transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source 11 may acquire video/image data through a capture, synthesis, or generation process of video/image. The video source may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transform, and quantization for compression and coding efficiency. The encoded data (encoded video/video information) may be output in a form of a bit stream.

The transmitter 13 may transmit the encoded video/video information or data output in the form of a bit stream to the receiver of the receive device through a digital storage medium or a network in a file or streaming format. The digital storage media may include various storage media such as a universal serial bus (USB), a secure digital (SD), a compact disk (CD), a digital video disk (DVD), Bluray, a hard disk drive (HDD), and a solid state drive (SSD). The transmitter 13 may include an element for generating a media file through a predetermined file format, and may include an element for transmission through a broadcast/communication network. The receiver 21 may extract the bit stream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

FIG. 2 is an embodiment to which the disclosure is applied, and is a schematic block diagram of an encoding apparatus for encoding a video/image signal. The encoding apparatus of FIG. 2 may correspond to the encoding apparatus 12.

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, a decoded picture buffer 170 may be configured with a hardware component (for example a memory or a digital storage medium) in an embodiment. And, the memory 170 may include a decoded picture buffer (DPB), and may be configured by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bit stream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bit stream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bit stream. The bit stream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the DPB 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bit stream form.

The modified reconstructed picture transmitted to the DPB 170 may be used as a reference picture in the inter predictor 180. The encoding apparatus can avoid a prediction mismatch in the encoding apparatus 100 and a decoding apparatus and improve encoding efficiency if inter prediction is applied.

The DPB 170 may store a modified reconstructed picture in order to use the modified reconstructed picture as a reference picture in the inter predictor 180.

FIG. 3 is an embodiment to which the disclosure is applied, and is a schematic block diagram of a decoding apparatus for decoding a video/image signal. The decoding apparatus of FIG. 3 may correspond to the decoding apparatus of FIG. 1.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the decoded picture buffer 250 may be configured with a hardware component (for example a memory or a digital storage medium) in an embodiment.

When a bit stream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bit stream form. The received signal may be decoded through the entropy decoder 210. For example, the entropy decoder 210 may derive information (e.g., video/image information) for image reconstruction (or picture reconstruction) by parsing the bit stream. For example, the entropy decoder 210 may decode information within the bit stream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bit stream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may obtain a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 250. The various filtering methods may include deblocking filtering, a sample adaptive offset SAO, an adaptive loop filter ALF, and a bilateral filter, for example.

A reconstructed picture transmitted (modified) to the DPB 250 may be used as a reference picture in the inter predictor 260.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

FIG. 4 shows a structural diagram of a content streaming system according to an embodiment of the disclosure.

The content streaming system to which the disclosure is applied may largely include an encoding server 410, a streaming server 420, a web server 430, a media storage 440, a user device 450, and a multimedia input device 460.

The encoding server 410 may compress the content input from multimedia input devices such as a smartphone, camera, camcorder, etc. into digital data to generate a bit stream and transmit it to the streaming server 420. As another example, when the multimedia input devices 460 such as the smartphone, camera, and camcorder directly generate a bit stream, the encoding server 410 may be omitted.

The bit stream may be generated by an encoding method or a bit stream generation method to which the disclosure is applied, and the streaming server 420 may temporarily store the bit stream in the process of transmitting or receiving the bit stream.

The streaming server 420 transmits multimedia data to the user device 450 based on a user request through the web server 430, and the web server 430 serves as an intermediary to inform the user of what service is present. When a user requests a desired service through the web server 430, the web server 430 delivers it to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bit stream for a predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultra book, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

Block Partitioning

A video/image coding method according to the present disclosure may be performed based on various detailed technologies, and each of the detailed technologies is schematically described as follows. It is evident to those skilled in the art that the technologies described below may be associated with related procedures, such as prediction, residual processing (transform, quantization, etc.), syntax element coding, filtering, and partitioning/splitting in video/image encoding/decoding procedures that have been described above and/or are to be described later.

Pictures may be divided into a sequence of coding tree units (CTUs). The CTU may correspond to a coding tree block (CTB). Alternatively, the CTU may include a coding tree block of luma samples and two coding tree blocks of corresponding chroma samples. In other words, with respect to a picture including a three-sample array, the CTU may include an N×N block of luma samples and two corresponding blocks of chroma samples.

FIG. 5 illustrates an example of multi-type tree split modes according to an embodiment of the present disclosure.

A CTU may be split into CUs based on a quad-tree (QT) structure. The quad-tree structure may also be called as a quaternary tree structure. This is for incorporating various local characteristics. Meanwhile, in the present disclosure, a CTU may be split based on a multi-type tree structure split including a binary-tree (BT) and a ternary-tree (TT) in addition to a quad-tree. Hereinafter, a QTBT structure may include quad-tree and binary tree-based split structures. A QTBTTT may include quad-tree, binary tree and ternary tree-based split structures. Alternatively, the QTBT structure may also include quad-tree, binary tree, and ternary tree-based split structures. In the coding tree structure, a CU may have a square or rectangular shape. The CTU may be first split in a quad-tree structure. Thereafter, leaf nodes of the quad-tree structure may be further split by a multi-type tree structure. For example, as illustrated in FIG. 6, a multi-type tree structure may schematically include four splitting types.

The four splitting types illustrated in FIG. 6 may include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). Leaf nodes of the multi-type tree structure may be called CUs. The CUs may be used for prediction and transform procedures. In the present disclosure, in general, a CU, a PU, and a TU may have the same block size. However, if a maximum supported transform length is smaller than the width or height of a color component of a CU, a CU and a TU may have different block sizes.

Prediction

In order to reconstruct a current processing unit on which decoding is performed, a current picture including a current processing unit or a decoded part of other pictures may be used.

In the reconstruction, if only the current picture is used, that is, a picture (slice) on which only intra prediction is performed may be denoted as an intra picture or an I-picture (I-slice). A picture (slice) using one motion vector and reference index in order to predict each unit may be denoted as a prediction picture or a P-picture (P-slice). A picture (slice) using two or more motion vectors and reference indices may be denoted a pair prediction picture or a B-picture (B-slice).

Inter prediction means a prediction method of deriving a sample value of a current block based on a data element (e.g., sample value or motion vector) of a picture other than a current picture. That is, inter prediction means a method of predicting a sample value of a current block by referring to reconstructed regions of another reconstructed picture other than a current picture.

Hereinafter, inter prediction is more specifically described.

Inter Prediction

The prediction unit of the encoding apparatus 100 and the decoding apparatus 200 may derive a prediction sample by performing inter prediction in a block unit. The inter prediction may mean prediction derived using a method dependent on data elements (e.g., sample value or motion information) of a picture(s) other than a current picture. If inter prediction is applied to a current block, a predicted block (prediction sample array) for the current block may be derived based on a reference block (reference sample array) specified by a motion vector on a reference picture indicated by a reference picture index. In this case, in order to reduce the amount of motion information transmitted in the inter prediction mode, motion information of the current block may be predicted in a block, subblock, or sample unit based on a correlation between pieces of motion information of a neighboring block and the current block. The motion information may include the motion vector and the reference picture index. The motion information may further include inter prediction type (L0 prediction, L1 prediction, or Bi prediction) information. If inter prediction is applied, a neighboring block may include a spatial neighboring block present in a current picture and a temporal neighboring block present in a reference picture. A reference picture including a reference block and a reference picture including a temporal neighboring block may be identical or different from each other. The temporal neighboring block may be denoted as a collocated reference block or a collocated CU (colCU). The reference picture including the temporal neighboring block may be denoted as a collocated picture (colPic). For example, a motion information candidate list may be configured based on neighboring blocks of a current block. In order to derive a motion vector and/or a reference picture index of a current block, a flag or index information indicating which candidate is selected (used) may be signaled. Inter prediction may be performed based on various prediction modes. For example, in the case of the skip mode and the merge mode, motion information of a current block may be the same as motion information of a selected neighboring block. In the case of the skip mode, a residual signal may not be transmitted unlike in the merge mode. In the case of the motion vector prediction (MVP) mode, a motion vector of a selected neighboring block may be used as a motion vector predictor. A motion vector difference may be signaled from the encoding apparatus 100 to the decoding apparatus 200. In this case, a motion vector of a current block may be derived using the sum of the motion vector predictor and the motion vector difference. A video/image encoding procedure based on inter prediction and the inter prediction unit 180 within the encoding apparatus 100 may be the same as those illustrated in FIGS. 6 and 7.

FIG. 6 illustrates an example of a flowchart for video/image encoding based on inter prediction according to an embodiment of the present disclosure. FIG. 7 illustrates an example of a block diagram of the inter prediction unit within the encoding apparatus according to an embodiment of the present disclosure.

In step S610, the encoding apparatus 100 performs inter prediction on a current block. In the present disclosure, the current block denotes a given block processed by the encoding apparatus 100 or the decoding apparatus 200. The encoding apparatus 100 may derive an inter prediction mode and motion information of the current block, and may generate prediction samples of the current block based on the inter prediction mode and the motion information. In this case, procedures for determining the inter prediction mode, deriving the motion information, and generating the prediction samples may be simultaneously performed. Any one procedure may be performed prior to another procedure. For example, the inter prediction unit 180 of the encoding apparatus 100 may include a prediction mode determination unit 181, a motion information derivation unit 182, and a prediction sample derivation unit 183. The prediction mode determination unit 181 may determine a prediction mode of the current block. The motion information derivation unit 182 may derive motion information of the current block. The prediction sample derivation unit 183 may derive motion samples of the current block. For example, the inter prediction unit 180 of the encoding apparatus 100 may search a block similar to the current block within a given region (search region) of reference pictures through motion estimation, and may derive a reference block whose difference with the current block is a minimum or given reference or less. The inter prediction unit 180 may derive a reference picture index indicative of a reference picture where the reference block is located based on information on a derived reference picture and the reference block, and may derive a motion vector based on a difference between the locations of the reference block and the current block. The encoding apparatus 100 may determine a prediction mode (e.g., skip mode, merge mode, or MVP mode) which may be applied to the current block among various prediction modes. The encoding apparatus 100 may compare rate-distortion costs (RD costs) between the various prediction modes, and may determine the best prediction mode for the current block.

For example, when the skip mode or the merge mode is applied to the current block, the encoding apparatus 100 may configure a merge candidate list to be described later, and may derive a reference block whose difference with the current block is a minimum or given reference or less, among reference blocks indicated by merge candidates included in the merge candidate list. In this case, (when the skip mode or the merge mode is applied), a merge candidate associated with the derived reference block may be selected. Merge index information indicating the selected merge candidate may be generated and signaled to the decoding apparatus. The inter prediction unit 180 may derive motion information of the current block by using motion information of the selected merge candidate.

For another example, when the (A)MVP mode is applied to the current block, the encoding apparatus 100 may configure an (A)MVP candidate list to be described later, and may use, as the MVP of the current block, a motion vector of an MVP candidate selected among motion vector predictor (MVP) candidates included in the (A)MVP candidate list. In this case, (when the MVP mode is applied), for example, a motion vector indicating a reference block derived by the aforementioned motion estimation may be used as a motion vector of the current block. An MVP candidate having a motion vector having the smallest difference with the motion vector of the current block, among the MVP candidates, may become the selected MVP candidate. A motion vector difference (MVD), that is, a difference obtained by subtracting the motion vector of the selected MVP candidate from the motion vector of the current block, may be derived. In this case, information on the MVD may be signaled to the decoding apparatus 200. Furthermore, when the (A)MVP mode is applied, a value of the reference picture index may be composed of reference picture index information and separately transmitted to the decoding apparatus 200.

In step S620, the encoding apparatus 100 may derive residual samples based on the prediction samples. The encoding apparatus 100 may derive the residual samples based on a comparison between the original samples of the current block and the prediction samples.

In step S630, the encoding apparatus 100 encodes image information, including prediction information and residual information. The encoding apparatus 100 may output the encoded image information in the form of a bit stream. The prediction information may include prediction mode information (e.g., skip flag, merge flag, or mode index) and motion information based on information related to a prediction procedure. The motion information may include candidate selection information (e.g., merge index, MVP flag, or MVP index), that is, information for deriving a motion vector. Furthermore, the motion information may include information on the aforementioned MVD and/or reference picture index information. Furthermore, the motion information may include information indicating whether L0 prediction, L1 prediction, or bi-directional (Bi) prediction is applied. The residual information is information on residual samples. The residual information may include information on quantized transform coefficients for the residual samples.

An output bit stream may be transmitted to the decoding apparatus 200 by being stored in a (digital) storage medium or may be transmitted to the decoding apparatus 200 over a network.

Meanwhile, as described above, the encoding apparatus 100 may store, in a memory, a reconstructed picture including reconstructed samples and a reconstructed block based on reference samples and residual samples, and may use the reconstructed picture as a reference picture for inter prediction. Procedures, such as in-loop filtering, may be further applied to the reconstructed picture.

A video/image decoding procedure based on inter prediction and the inter prediction unit 260 within the decoding apparatus 200 may be schematically the same as those illustrated in FIGS. 8 and 9.

FIG. 8 illustrates an example of a flowchart for video/image decoding based on inter prediction according to an embodiment of the present disclosure. FIG. 9 illustrates an example of a block diagram of an inter prediction unit within the decoding apparatus according to an embodiment of the present disclosure.

The decoding apparatus 200 may perform an operation corresponding to an operation performed in the encoding apparatus 100. The decoding apparatus 200 may perform prediction on a current block based on received prediction information, and may derive prediction samples.

Specifically, in step S810, the decoding apparatus 200 may determine a prediction mode of a current block based on received prediction information. The decoding apparatus 200 may determine an inter prediction mode which may be applied to the current block based on prediction mode information of the prediction information.

For example, the decoding apparatus 200 may determine whether the merge mode is applied or the (A)MVP mode is applied to the current block based on a merge flag. Furthermore, the decoding apparatus 200 may select one of various inter prediction mode candidates based on a mode index. The inter prediction mode candidates may include the skip mode, the merge mode and/or the (A)MVP mode or may include various inter prediction modes to be described later.

In step S820, the decoding apparatus 200 derives motion information of the current block based on the determined inter prediction mode. For example, when the skip mode or the merge mode is applied to the current block, the decoding apparatus 200 may configure a merge candidate list to be described later, and may select one of merge candidates included in the merge candidate list. The selection of the merge candidate may be performed based on the aforementioned selection information (e.g., merge index). The decoding apparatus 200 may derive the motion information of the current block by using motion information of the selected merge candidate. The motion information of the selected merge candidate may be used as the motion information of the current block.

For another example, when the (A)MVP mode is applied to the current block, the decoding apparatus 200 may configure an (A)MVP candidate list to be described later, and may use, as a motion vector of the current block, a motion vector of an MVP candidate selected among MVP candidates included in the (A)MVP candidate list. The selection of the MVP candidate may be performed based on the aforementioned selection information (MVP flag or MVP index). In this case, (when the MVP mode is applied) the decoding apparatus 200 may derive an MVD of the current block based on information on the MVD, and may derive the motion vector of the current block based on a motion vector of the selected MVP and the MVD. Furthermore, the decoding apparatus 200 may derive a reference picture index of the current block based on reference picture index information. In a reference picture list related to the current block, a picture indicated by a reference picture index may be derived as a reference picture referred for inter prediction of the current block.

Meanwhile, as will be described later, motion information of a current block may be derived without configuring a candidate list. In this case, the motion information of the current block may be derived according to a procedure disclosed in a prediction mode to be described later. In this case, the aforementioned configuration of the candidate list may be omitted.

In step S830, the decoding apparatus 200 may generate prediction samples of the current block based on the motion information of the current block. In this case, the decoding apparatus 200 may derive a reference picture based on a reference picture index of the current block, and may derive the prediction samples of the current block by using samples of a reference block indicated by a motion vector of the current block on the reference picture. In this case, as will be described later, a prediction sample filtering procedure may be further performed on all or some of the prediction samples of the current block according to circumstances.

For example, the inter prediction unit 260 of the decoding apparatus 200 may include a prediction mode determination unit 261, a motion information derivation unit 262, and a prediction sample derivation unit 263. The prediction mode determination unit 181 may determine a prediction mode for the current block based on the received prediction mode information. The motion information derivation unit 182 may derive motion information (motion vector and/or reference picture index) of the current block based on the received motion information. The prediction sample derivation unit 183 may derive the prediction samples of the current block.

In step S840, the decoding apparatus 200 generates residual samples of the current block based on received residual information. In step S850, the decoding apparatus 200 may generate reconstructed samples of the current block based on the prediction samples and the residual samples, and may generate a reconstructed picture based on the reconstructed samples. Thereafter, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

Determination of Inter Prediction Mode

Various inter prediction modes may be used for the prediction of a current block within a picture. For example, various modes, such as a merge mode, a skip mode, an MVP mode, and an affine mode, may be used. A decoder side motion vector refinement (DMVR) mode and an adaptive motion vector resolution (AMVR) mode may be further used as additional modes. The affine mode may be denoted as an affine motion prediction mode. The MVP mode may be denoted as an advanced motion vector prediction (AMVP) mode.

Prediction mode information indicative of an inter prediction mode of a current block may be signaled from the encoding apparatus 100 to the decoding apparatus 200. The prediction mode information may be included in a bit stream and transmitted to the decoding apparatus 200. The prediction mode information may include index information indicative of one of multiple candidate modes. Furthermore, the prediction mode information may also indicate an inter prediction mode through hierarchical signaling of flag information. In this case, the prediction mode information may include one or more flags. For example, whether to apply the skip mode may be indicated through the signaling of a skip flag, whether to apply the merge mode may be indicated through the signaling of a merge flag if the skip mode is not applied, and the application of the MVP mode may be indicated (implied) or a flag for additional distinction may be further signaled if the merge mode is not applied. The Affine mode may be signaled as an independent mode or may be signaled as a mode dependent on the merge mode or the MVP mode. For example, the Affine mode, as will be described later, may be composed of one candidate of a merge candidate list or an MVP candidate list.

Derivation of Motion Information According to Inter Prediction Mode

Inter prediction may be performed based on motion information of a current block. The encoding apparatus 100 may derive the best motion information of the current block through a motion estimation procedure. For example, the encoding apparatus 100 may derive the motion information by searching, in an integer or fraction pixel unit, a predetermined search range within a reference picture for a similar reference block having a high correlation by using the original block within the original picture related to the current block. Similarity between blocks may be derived based on a difference between phase-based sample values. For example, similarity between blocks may be calculated based on the sum of difference (SAD) between a current block (or the template of the current block) and a reference block (or the template of a reference block). In this case, motion information may be derived based on a reference block having the smallest SAD within a search region. The derived motion information may be signaled to the decoding apparatus 200 in various manners based on an inter prediction mode.

Merge Mode and Skip Mode

When the merge mode is applied, motion information of a current prediction block is not directly transmitted, and the motion information of the current prediction block is derived based on motion information of a neighboring prediction block. Accordingly, the motion information of the current prediction block may be indicated through flag information for providing notification that the merge mode is used and a merge index for providing notification which neighboring prediction block is used.

The encoding apparatus 100 may search a merge candidate block used to derive the motion information of the current prediction block according to the merge mode. For example, a maximum of 5 merge candidate blocks may be used, but an embodiment of the present disclosure is not limited thereto. The number of merge candidate blocks may be various. Furthermore, a maximum number of merge candidate blocks may be transmitted in a slice header unit, but an embodiment of the present disclosure is not limited thereto. A maximum number of merge candidate blocks may be transmitted in various manners. After searching the merge candidate blocks, the encoding apparatus 100 may generate a merge candidate list, and may select, as the final merge candidate block, a merge candidate block having the smallest cost among merge candidates included in the merge candidate lists.

An embodiment of the present disclosure provides a method for configuring a merge candidate list.

FIG. 10 illustrates an example of spatial neighboring blocks for inter prediction according to an embodiment of the present disclosure.

For example, a merge candidate list may include five merge candidate blocks. For example, the merge candidate list may include four spatial merge candidates and one temporal merge candidate. As a detailed example, in the case of a spatial merge candidate, the blocks illustrated in FIG. 10 may be used as spatial merge candidates.

A merge candidate list for a current block may be configured based on a procedure, such as FIG. 11, for example.

FIG. 11 illustrates an example of a flowchart for configuring a merge candidate list according to an embodiment of the present disclosure.

In step S1110, the coding apparatus (the encoding apparatus 100 or the decoding apparatus 200) inserts, into a merge candidate list, spatial merge candidates derived by searching spatial neighboring blocks of a current block. For example, the spatial neighboring blocks may include a bottom left corner neighboring block A0, left neighboring block A1, top right corner neighboring block B0, top neighboring block B1, and top left corner neighboring block B2 of the current block. However, this is an example, and additional neighboring blocks, such as a right neighboring block, bottom neighboring block, and bottom right neighboring block of the current block, in addition to the aforementioned spatial neighboring blocks may be used as spatial neighboring blocks for configuring the merge candidate list of the current block. The coding apparatus may detect available blocks through search based on priority between the spatial neighboring blocks, and may derive motion information of the detected blocks as the spatial merge candidates. For example, the encoding apparatus 100 and the decoding apparatus 200 may construct the merge candidate list by searching the five blocks illustrated in FIG. 10 in order of A1, B1, B0, A0, and B2 and sequentially indexing available candidates.

In step S1120, the coding apparatus inserts, into the merge candidate list, a temporal merge candidate derived by searching a temporal neighboring block of the current block. The temporal neighboring block may be located on a reference picture, that is, a picture different from a current picture where the current block is located. The reference picture where the temporal neighboring block is located may be denoted as a collocated picture or a col picture. The temporal neighboring blocks may be searched in order of a bottom right corner neighboring block and bottom right center block of a collocated block for the current block on the col picture. Meanwhile, if motion data compression is applied, specific motion information may be stored in the col picture as representative motion information for each given storage unit. In this case, the coding apparatus does not need to store motion information of all blocks within the given storage unit, thereby being capable of obtaining a motion data compression effect. In this case, the given storage unit may be predetermined in a 16×16 sample unit or an 8×8 sample unit, for example, or size information of the given storage unit may be signaled from the encoding apparatus 100 to the decoding apparatus 200. If the motion data compression is applied, the motion information of the temporal neighboring block may be substituted with representative motion information of the given storage unit in which the temporal neighboring block is located. That is, in this case, from the viewpoint of an implementation aspect, the temporal merge candidate may be derived based on motion information of a prediction block that covers a location arithmetically left shifted after an arithmetic right shift by a given value based on the coordinate of (top left sample position) of the temporal neighboring block, not a prediction block located at the coordinates of the temporal neighboring block. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

In step S1130, the coding apparatus may check whether the current number of merge candidates is smaller than a maximum number of merge candidates. The maximum number of merge candidates may be pre-defined or may be signaled from the encoding apparatus 100 to the decoding apparatus 200. For example, the encoding apparatus 100 may generate information on the maximum number of merge candidates, may encode the generated information, and may transmit the encoded information to the decoding apparatus 200 in the form of a bit stream. When the maximum number of merge candidates is filled, a candidate additional process may not be performed.

In step S1140, when the current number of merge candidates is smaller than the maximum number of merge candidates, the coding apparatus inserts an additional merge candidate into the merge candidate list. For example, the additional merge candidate may include an ATMVP, a combined bi-predictive merge candidate (when a slice type of a current slice is a B type) and/or a zero vector merge candidate.

When the current number of merge candidates is not smaller than the maximum number of merge candidates, the coding apparatus may terminate the configuration of the merge candidate list. In this case, the encoding apparatus 100 may select the best merge candidate of merge candidates constructing the merge candidate list based on an RD cost, and may signal, to the decoding apparatus 200, selection information (e.g., merge index) indicating the selected merge candidate. The decoding apparatus 200 may select the best merge candidate based on the merge candidate list and the selection information.

Motion information of the selected merge candidate may be used as the motion information of the current block. Prediction samples of the current block may be derived based on the motion information of the current block. The encoding apparatus 100 may derive residual samples of the current block based on the prediction samples, and may signal, to the decoding apparatus 200, residual information related to the residual samples. The decoding apparatus 200 may generate reconstructed samples based on the prediction samples and the residual samples derived based on the residual information, and may generate a reconstructed picture based on the reconstructed samples.

When the skip mode is applied, the coding apparatus may derive motion information of the current block in the same manner as the merge mode is applied. However, when the skip mode is applied, a residual signal for a corresponding block is omitted. Accordingly, prediction samples may be directly used as reconstructed samples.

MVP Mode

When the motion vector prediction (MVP) mode is applied, a motion vector predictor (MVP) candidate list may be generated based on a motion vector of a reconstructed spatial neighboring block (e.g., a neighboring block in FIG. 10) and/or a motion vector corresponding to a temporal neighboring block (or Col block). That is, the motion vector of the reconstructed spatial neighboring block and/or the motion vector corresponding to the temporal neighboring block may be used as motion vector predictor candidates. Information on prediction may include selection information (e.g., MVP flag or MVP index) indicating the best motion vector predictor candidate selected among motion vector predictor candidates included in a motion vector predictor candidate list. In this case, the prediction unit may select a motion vector of a current block predictor among the motion vector predictor candidates, included in the motion vector candidate list, by using the selection information. The prediction unit of the encoding apparatus 100 may calculate a motion vector difference (MVD) between the motion vector of the current block and the motion vector predictor, may encode the MVD, and may output the encoded MVD in the form of a bit stream. That is, the MVD may correspond to a value obtained by subtracting the motion vector predictor from the motion vector of the current block. In this case, the prediction unit of the decoding apparatus 200 may obtain the MVD included in information on prediction, and may derive the motion vector of the current block through the addition of the MVD and the motion vector predictor. The prediction unit of the decoding apparatus 200 may obtain or derive, from the information on prediction, a reference picture index indicating a reference picture. For example, the motion vector predictor candidate list may be configured as in FIG. 12.

FIG. 12 illustrates an example of a flowchart for configuring a motion vector predictor candidate list according to an embodiment of the present disclosure.

In step S1210, the coding apparatus searches spatial candidate blocks for predicting a motion vector of a current block, and inserts the spatial candidate block into a prediction candidate list. The spatial candidate blocks may include the neighboring blocks A0, A1, B0, B1, and B2 of the current block illustrated in FIG. 10. The coding apparatus may search a candidate block available for the prediction of the current block among the spatial candidate blocks, and may add a motion vector predictor (information on the motion vector) of the available spatial candidate block into the prediction candidate list.

In step S1220, the coding apparatus determines whether the number of spatial candidate blocks included in a current prediction candidate list is smaller than a maximum number of candidates (e.g., 2). FIG. 12 illustrates that the maximum number of candidates is 2, but an embodiment of the present disclosure is not limited thereto. The maximum number of candidates may be variously set depending on an implementation.

When the number of spatial candidate blocks is greater than or equal to the maximum number of candidates, the coding apparatus terminates the configuration of the prediction candidate list. When the number of spatial candidate blocks is smaller than the maximum number of candidates, the coding apparatus proceeds to step S1230. In step S1230, the coding apparatus searches a temporal candidate block and adds the temporal candidate block to the prediction candidate list. Furthermore, in step S1240, if the temporal candidate block is unavailable, the coding apparatus may add a zero motion vector to the prediction candidate list.

Generation of Prediction Sample

The coding apparatus may derive a predicted block of a current block based on motion information derived according to a prediction mode. The predicted block may include prediction samples (prediction sample array) of the current block. If a motion vector of the current block indicates a fraction sample unit, an interpolation procedure may be performed. The prediction samples of the current block may be derived based on reference samples of the fraction sample unit within a reference picture through the interpolation procedure. If affine inter prediction is applied to the current block, the prediction samples may be generated based on a motion vector of a sample/subblock unit. If bi-directional prediction is applied, the final prediction samples may be derived through a weighted sum (according to a phase) of prediction samples derived based on L0 prediction and prediction samples derived based on L1 prediction. In this case, each of weight values applied to an L0 prediction sample and an L1 prediction sample may be denoted as a generalized Bi-prediction (GBi) weight.

Reconstructed samples and a reconstructed picture may be generated based on the derived prediction samples. Thereafter, a procedure, such as in-loop filtering, may be performed.

History-Based MVP (HMVP)

A history-based MVP method is proposed. In this case, an HMVP candidate is defined as motion information of a previously coded block. A table composed of multiple MVP candidates is maintained in an encoding/decoding process. The table is empted when a new slice (slice) is introduced. Whenever an inter-coded block is present, related motion information is added to the last entry of the table as a new HMVP candidate. An overall coding flowchart is illustrated in FIG. 13.

FIG. 13 illustrates an example of a decoding flowchart to which an HMVP method according to an embodiment of the present disclosure is applied.

Referring to FIG. 13, after a table composed of HMVP candidates is loaded, decoding is performed using the HMVP candidates, and the update of the table is performed using decoded motion information.

FIGS. 14a and 14b illustrate examples of a method for updating a table in an HMVP method according to an embodiment of the present disclosure.

In the present disclosure, a table size S may be set to 16, which illustrates that a maximum of 16 candidates may be added to the table. If HMVP candidates greater than 16 are present from previously coded blocks, the table may always include the most recently coded 16 motion candidates by being applied with a first-in first-out (FIFO) rule. FIG. 14a illustrates an example in which the FIFO rule is applied, an HMVP candidate is removed, and a new candidate is added to the table.

In order to further increase coding efficiency, a constraint FIFO rule is introduced. In this case, when an HMVP is inserted into a table, redundancy check is first checked, and whether the same HMVP is present in the table is searched for. If a redundant HMVP is retrieved, the same HMVP is removed from the table, and all HMVP candidates are moved afterwards (i.e., an index is decreased by 1).

HMVP candidates may be used in a merge candidate list configuration process. All HMVP candidates from the last entry to the first entry in a table are inserted after a TMVP candidate (temporal merge candidate). When a total number of available merge candidates reaches the number of signaled maximally allowed merge candidates, the merge candidate list configuration process is terminated.

Likewise, the HMVP candidates may be used in an AMVP candidate list configuration process. Motion vectors of the last K HMVP candidates are inserted into a table after a TMVP candidate. Only HMVP candidates having the same reference picture as an AMVP target reference picture may be used to configure an AMVP candidate list. Pruning may be applied to the HMVP candidates. In this case, the K value may be set to 4.

Additionally, when a total number of merge candidates is greater than or equal to 15, a binarization method of adding a fixed length (3 bits) to a truncated unary is applied to code a merge index. The binarization method is tabled as in Table 1 by using a total number of merge candidates indicated as Nmrg.

TABLE 1

| merge index | Bin String | | | | | | | | | |
|---|---|---|---|---|---|---|---|---|---|---|
| 0 | 0 | | | | | | | | | |
| 1 | 1 | 0 | | | | | | | | |
| 2 | 1 | 1 | 0 | | | | | | | |
| ... | | | | | | | | | | |
| 5 | 1 | 1 | 1 | 1 | 1 | 0 | | | | |
| 6 | 1 | 1 | 1 | 1 | 1 | 1 | 0 | | | |
| 7 | 1 | 1 | 1 | 1 | 1 | 1 | 1 | 0 | 0 | 0 |
| 8 | 1 | 1 | 1 | 1 | 1 | 1 | 1 | 0 | 0 | 1 |
| ... | | | | | | | | | | |
| 14 | 1 | 1 | 1 | 1 | 1 | 1 | 1 | 1 | 1 | 1 |
| Bin index | 0 | 1 | 2 | 3 | 4 | 5 | 6 | 7 | 8 | 9 |

An embodiment of the present disclosure relates to a still image or moving image encoding/decoding method and apparatus, and relates to a method of considering information related to a bi-directional prediction weight or generalized bi-prediction (GBi) in a process of configuring a prediction candidate based on the HMVP of an inter prediction process.

Embodiment 1

An embodiment of the present disclosure proposes a method of considering a GBi index or a GBi weight in an HMVP buffer update process. The HMVP buffer update process may be the same as FIG. 13. As described with reference to FIG. 13, the HMVP buffer stores/manages only decoded motion information. The present embodiment proposes a method of storing/managing decoded GBi or GBi information derived in a decoding process in addition to motion information.

In the present embodiment, a detailed method of a process represented as "Update the table with decoded motion information" in FIG. 13 is described.

FIGS. 15a and 15b illustrate examples of a method for updating an HMVP buffer according to an embodiment of the present disclosure.

FIG. 15a is a diagram describing a process of updating the existing HMVP buffer. In FIG. 15a, the HMVP buffer stores HMVP candidate information including motion information. Information of a decoded motion vector is updated in the HMVP buffer. In one embodiment, as described above, when a total number of HMVP buffers reaches a maximum number according to the FIFO rule, the oldest HMVP candidate may be removed when a new HMVP is added.

FIG. 15b is a diagram describing a proposed process of updating an HMVP buffer in an embodiment of the present disclosure. As illustrated in FIG. 15b, the HMVP buffer may store GBi information (bi-directional prediction weight information) in addition to information on a motion vector. Furthermore, updates may be performed using GBi information along with decoded motion information. In a same way as FIG. 15a, in the state in which a maximum number of HMVP candidate of the HMVP buffer have been filled according to the FIFO rule, when a new HMVP candidate and GBi information are added, the oldest HMVP candidate and GBi information may be removed from the HMVP buffer.

Embodiment 2

An embodiment of the present disclosure proposes a method of performing pruning by considering a GBi index or a GBi weight in an HMVP buffer update process. If updates are performed in a limited FIFO form, check for the identity is performed by comparing motion information of the existing HMVP buffer with motion information to be newly stored. If the motion information to be newly stored has the same prediction direction (interDir), reference index, and motion vector as motion information stored in the existing HMVP buffer, the same motion information is removed from the existing HMVP buffer. Thereafter, the motion information to be newly stored is stored in the HMVP buffer according to the FIFO rule. An embodiment of the present disclosure proposes a method of identifying whether GBi indices or weights are identical in addition to motion information (prediction direction, reference index, and motion vector) in this process.

The present embodiment is a detailed method of a process represented as "Update the table with decoded motion information" in FIG. 13, and may be described like FIG. 16.

FIG. 16 illustrates an example of a flowchart for updating an HMVP buffer according to an embodiment of the present disclosure.

Referring to FIG. 16, first, in step S1605, the coding apparatus resets an HMVP buffer index. For example, the HMVP buffer index (bufidx) may be set to 0.

In step S1610, the coding apparatus determines whether a current buffer index (bufidx) is smaller than the number of HMVP candidates present in an HMVP buffer. That is, the coding apparatus determines whether search for the HMVP candidates present in the HMVP buffer has been fully completed. When the current buffer index is greater than or equal to the number of HMVP candidates, the HMVP buffer update process is terminated.

When the current buffer index is smaller than the number of HMVP candidates, the coding apparatus may proceed to step S1620. Prior to step S1620, in step S1615, the coding apparatus may obtain motion information and a Gbi index used in a previously coded block. Thereafter, in steps S1620 and S1625, the coding apparatus checks whether the motion information and GBi information of the previous block obtained in step S1615 are identical with motion information and GBi information stored in the HMVP buffer. More specifically, the coding apparatus may check whether a prediction direction, a reference index, a motion vector, and GBi information included in the motion information of the previous block are identical with a prediction direction, reference index, motion vector, and GBi information of an HMVP candidate corresponding to a current index in the HMVP buffer.

When the motion information and GBi information of the previous block are identical with the motion information and GBi information of the HMVP candidate corresponding to the current index in the HMVP buffer, the coding apparatus proceeds to step S1630, and may perform pruning. That is, the coding apparatus may remove, from the HMVP buffer, an HMVP candidate including the same motion information and GBi information, and may add the motion information and GBi information of the previously coded block as a new HMVP candidate.

When the motion information and GBi information of the previous block are different from the motion information and GBi information of the HMVP candidate corresponding to the current index in the HMVP buffer, the coding apparatus may proceed to step S1635 and increase an HMVP buffer index. Thereafter, the coding apparatus may perform pruning check on an HMVP candidate of the HMVP buffer corresponding to the increased index.

As illustrated in FIG. 16, in the pruning process, there is proposed a method of checking whether a GBi index or a GBi weight are identical with GBi information of a candidate stored in the existing HMVP buffer and performing pruning.

The methods of embodiment 1 and embodiment 2 may be combined, and an actual HMVP buffer may prune motion information and GBi information and store/manage the motion information and the GBi information as in FIGS. 17a to 17c.

FIGS. 17a to 17c illustrate examples of a method for updating an HMVP buffer by considering generalized bi-prediction (GBi) information according to an embodiment of the present disclosure.

Referring to FIG. 17a, an HVMP candidate (HMVP 3) having the same motion information and GBi information as those of an inputted HMVP candidate is searched in the HMVP buffer. Thereafter, as in FIG. 17b, the same HMVP candidate (HMVP 3) is removed, and motion information and GBi information of a new HMVP candidate are added to the HMVP buffer as in FIG. 17c.

Embodiment 3

An embodiment of the present disclosure proposes a method of performing pruning by considering a GBi index or a GBi weight in a process of configuring a prediction candidate based on an HMVP. Embodiment 1 and embodiment 2 relate to the method of handling the HMVP buffer, whereas embodiment 3 proposes a method of configuring a prediction candidate through an HMVP buffer. According to embodiment 3, there is proposed a method of checking whether an HMVP candidate stored in an HMVP buffer and another prediction candidate configured according to a method of configuring a prediction candidate are identical and performing pruning based on the check. One proposed embodiment may be applied to all inter-prediction technologies for configuring prediction candidates by using an HMVP candidate, and may be applied to a case where an HMVP candidate is used in a prediction candidate configuration process such as in a merge, affine, AMVP, a merge with motion vector difference (MMVD), a triangle, and intra/Inter Multi-Hypothesis, for example.

The present embodiment may be performed in the motion information derivation process corresponding to step S820 of FIG. 8, and may correspond to an example of a method of updating an HMVP buffer as in FIG. 13. The present embodiment may be used in various inter prediction candidate configuration processes, but is described by taking FIGS. 11 and 12 as examples, for the easiness of description. FIG. 11 is a flowchart, in brief, describing a merge candidate configuration process, and FIG. 12 is a flowchart, in brief, describing an AMVP prediction candidate configuration process. FIG. 18a illustrates a method of configuring a merge prediction candidate by adding an HMVP prediction candidate method to the merge candidate configuration process of FIG. 11. FIG. 18b illustrates a method for configuring a prediction candidate list to which a pruning process of checking identity between an HMVP prediction candidate and the existing configured prediction candidate has been added based on FIG. 18a.

First, referring to FIG. 18a, in step S1805, the coding apparatus inserts, into a merge candidate list, spatial merge candidates derived by searching spatial neighboring blocks. In this case, the spatial neighboring blocks may include the neighboring blocks A0, A1, B0, B1, and B2 in FIG. 10. More specifically, the coding apparatus may add, to the merge candidate list, information on prediction directions, reference picture indices or motion vectors of the spatial neighboring blocks as merge candidates.

In step S1810, the coding apparatus inserts, into the merge candidate list, a temporal merge candidate derived by searching temporal neighboring blocks. The temporal neighboring blocks may be located on a reference picture, that is, a picture different from a current picture where the current block is located. The reference picture where the temporal neighboring block is located may be denoted as a collocated picture or a col picture. The temporal neighboring blocks may be searched in order of a bottom right corner neighboring block and bottom right center block of a collocated block for the current block on a col picture.

In step S1815, the coding apparatus determines whether the number of merge candidates included in a current merge candidate list is smaller than a maximum number of merge candidates. The maximum number of merge candidates may be set to a pre-determined number (e.g., 5). When the current number of merge candidates is not smaller than the maximum number of merge candidates (i.e., the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S1820. In step S1820, the coding apparatus inserts an HMVP merge candidate into the merge candidate list. The HMVP merge candidate inserted into the merge candidate list may be at least one of HMVP candidates stored in the HMVP buffer (HMVP candidate list). For example, an HVMP candidate most recently stored in the HMVP candidate list may be added to the merge candidate list. Furthermore, an HMVP candidate corresponding to a specific index (e.g., HMVP index) in the HMVP candidate list or an HMVP candidate having an index corresponding to a value obtained by subtracting an HMVP index from the number of HMVP candidates may be added to the merge candidate list.

After the HMVP candidate is inserted into the merge candidate list, in step S1825, the coding apparatus determines whether the number of merge candidates included in a current merge candidate list is smaller than a maximum number of merge candidates. The maximum number of merge candidates may be set to a pre-determined number (e.g., 5). When the current number of merge candidates is not smaller than the maximum number of merge candidates (i.e., when the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S1830. In step S1830, the coding apparatus inserts an additional merge candidate into the merge candidate list. For example, the additional merge candidate may include an ATMVP, a combined bi-predictive merge candidate (when a slice type of a current slice is a B type) and/or a zero vector merge candidate.

Compared to FIG. 18a, the flowchart of FIG. 18b illustrates a method of configuring a merge candidate list, including GBi information (bi-directional prediction weight information) and a pruning process.

Referring to FIG. 18b, in step S1855, the coding apparatus inserts, into a merge candidate list, spatial merge candidates derived by searching spatial neighboring blocks. In this case, the spatial neighboring blocks may include the neighboring blocks A0, A1, B0, B1, and B2 in FIG. 10. More specifically, the coding apparatus may add, to the merge candidate list, GBi information (bi-directional prediction weight or bi-directional prediction weight index) as merge candidates along with information on prediction directions, reference picture indices, and motion vectors of the spatial neighboring blocks.

In step S1860, the coding apparatus inserts, into the merge candidate list, a temporal merge candidate derived by searching temporal neighboring blocks. The temporal neighboring blocks may be located on a reference picture, that is, a picture different from a current picture where the current block is located. The reference picture where the temporal neighboring block is located may be denoted as a collocated picture or a col picture. The temporal neighboring blocks may be searched in order of a bottom right corner neighboring block and bottom right center block of a collocated block for the current block on the col picture.

In step S1865, the coding apparatus determines whether the number of merge candidates included in a current merge candidate list is smaller than a maximum number of merge candidates. The maximum number of merge candidates may be set as a pre-determined number (e.g., 5). When the current number of merge candidates is not smaller than the maximum number of merge candidates (i.e., when the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S1870. In steps S1870 and S1875, the coding apparatus checks whether motion information and GBi information of the HMVP merge candidate are identical with those of the existing configured merge candidates. That is, the coding apparatus determines whether a merge candidate having the same motion information and GBi information as an HMVP merge candidate to be added among the merge candidates included in the current merge candidate list is present. The HMVP merge candidate inserted into the merge candidate list may be at least one of HMVP candidates stored in an HMVP buffer (HMVP candidate list). For example, an HVMP candidate most recently stored in the HMVP candidate list may be added to the merge candidate list. Furthermore, an HMVP candidate corresponding to a specific index (e.g., HMVP index) in the HMVP candidate list or an HMVP candidate having an index corresponding to a value obtained by subtracting an HMVP index from the number of HMVP candidates may be added to the merge candidate list. If the same merge candidate is not present, the coding apparatus proceeds to step S1885.

If the same merge candidate is present, the coding apparatus proceeds to step S1880 and inserts the HMVP merge candidate into the merge candidate list. The HMVP merge candidate may include motion information and GBi information.

In step S1885, the coding apparatus determines whether the number of merge candidates included in the current merge candidate list is smaller than a maximum number of merge candidates. The maximum number of merge candidates may be set as a pre-determined number (e.g., 5). When the current number of merge candidates is not smaller than the maximum number of merge candidates (i.e., when the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S1890. In step S1890, the coding apparatus inserts an additional merge candidate into the merge candidate list. For example, the additional merge candidate may include an ATMVP, a combined bi-predictive merge candidate (when a slice type of a current slice is a B type) and/or a zero vector merge candidate.

FIG. 19a illustrates a method of considering an HMVP candidate in the AMVP prediction candidate configuration process of FIG. 12. FIG. 19b illustrates a method of considering GBi in a process of checking identity between the existing configured prediction candidate and an HMVP prediction candidate in a process of configuring an HMVP candidate as a prediction candidate based on FIG. 19a.

Referring first to FIG. 19a, in step S1905, the coding apparatus predicts spatial motion vector prediction candidates derived by searching spatial neighboring blocks, and inserts the spatial motion vector prediction candidates into a list. In this case, the spatial neighboring blocks may include the neighboring blocks A0, A1, B0, B1, and B2 in FIG. 10. More specifically, the coding apparatus may add, to a prediction candidate list, information on prediction directions, reference picture indices or motion vectors of the spatial neighboring blocks as motion vector candidates.

In step S1910, the coding apparatus determines whether the number of motion vector prediction candidates included in a current prediction candidate list is smaller than a maximum number of candidates. The maximum number of motion vector prediction candidates may be set as a pre-determined number (e.g., 5). When the current number of motion vector prediction candidates is not smaller than the maximum number of candidates (i.e., when the current number of motion vector prediction candidates is greater than or equal to the maximum number of candidates or when the current motion vector prediction candidate list is fully filled), the coding apparatus may terminate the configuration of the motion vector prediction candidate list.

In step S1915, the coding apparatus inserts, into the motion vector prediction candidate list, a temporal prediction candidate derived by searching a temporal prediction candidate block. The temporal prediction candidate block may be located on a reference picture, that is, a picture different from a current picture where the current block is located. The reference picture where a temporal neighboring block is located may be denoted as a collocated picture or a col picture. The temporal neighboring blocks may be searched in order of a bottom right corner neighboring block and bottom right center block of a collocated block for the current block on the col picture.

In step S1920, the coding apparatus determines whether the number of motion vector prediction candidates included in a current motion vector prediction candidate list is smaller than a maximum number of candidates. The maximum number of motion vector prediction candidates may be set as a pre-determined number (e.g., 5). When the current number of motion vector prediction candidates is not smaller than the maximum number of candidates (i.e., when the current number of motion vector prediction candidates is greater than or equal to the maximum number of candidates or when the current motion vector prediction candidate list is fully filled), the coding apparatus may terminate the configuration of the motion vector prediction candidate list.

When the current number of motion vector prediction candidates is smaller than the maximum number of candidates (i.e., when the current motion vector prediction candidate list is not fully filled), the coding apparatus proceeds to step S1925. In step S1925, the coding apparatus inserts an HMVP prediction candidate into the motion vector prediction candidate list. The HMVP prediction candidate inserted into the motion vector prediction candidate list may be at least one of HMVP candidates stored in an HMVP buffer (HMVP candidate list). For example, an HVMP candidate most recently stored in the HMVP candidate list may be added to the motion vector prediction candidate list. Furthermore, an HMVP candidate corresponding to a specific index (e.g., HMVP index) in the HMVP candidate list or an HMVP candidate having an index corresponding to a value obtained by subtracting an HMVP index from the number of HMVP candidates may be added to the motion vector prediction candidate list.

Compared to FIG. 19a, the flowchart of FIG. 19b illustrates a method of configuring a motion vector prediction candidate list, including GBi information (bi-directional prediction weight information) and a pruning process.

Referring to FIG. 19b, in step S1955, the coding apparatus inserts, into a motion vector prediction candidate list, spatial motion vector prediction candidates derived by searching spatial neighboring blocks. In this case, the spatial neighboring blocks may include the neighboring blocks A0, A1, B0, B1, and B2 in FIG. 10. More specifically, the coding apparatus may add, to the motion vector prediction candidate list, GBi information (bi-directional prediction weight or bi-directional prediction weight index) as motion vector prediction candidates along with information on prediction directions, reference picture indices, and motion vectors of the spatial neighboring blocks.

In step S1960, the coding apparatus determines whether the number of motion vector prediction candidates included in a current prediction candidate list is smaller than a maximum number of candidates. The maximum number of motion vector prediction candidates may be set as a pre-determined number (e.g., 5). When the current number of motion vector prediction candidates is not smaller than the maximum number of candidates (i.e., when the current number of motion vector prediction candidates is greater than or equal to the maximum number of candidates or when the current motion vector prediction candidate list is fully filled), the coding apparatus may terminate the configuration of the motion vector prediction candidate list.

In step S1965, the coding apparatus inserts, into the motion vector prediction candidate list, a temporal prediction candidate derived by searching a temporal prediction candidate block. The temporal prediction candidate block may be located on a reference picture, that is, a picture different from a current picture where a current block is located. The reference picture where a temporal neighboring block is located may be denoted as a collocated picture or a col picture. The temporal neighboring blocks may be searched in order of a bottom right corner neighboring block and bottom right center block of a collocated block for the current block on the col picture.

In step S1970, the coding apparatus determines whether the number of motion vector prediction candidates included in a current prediction candidate list is smaller than a maximum number of candidates. The maximum number of motion vector prediction candidates may be set as a pre-determined number (e.g., 5). When the current number of motion vector prediction candidates is not smaller than the maximum number of candidates (i.e., when the current number of motion vector prediction candidates is greater than or equal to the maximum number of candidates or when the current motion vector prediction candidate list is fully filled), the coding apparatus may terminate the configuration of the motion vector prediction candidate list.

When the current number of motion vector prediction candidates is smaller than the maximum number of candidates (i.e., when the current motion vector prediction candidate list is not fully filled), the coding apparatus proceeds to step S1975. In steps S1975 and S1980, the coding apparatus checks motion information and GBi information of an HMVP candidate are identical with those of the existing configured motion vector prediction candidates. That is, the coding apparatus determines whether a motion vector prediction candidate having the same motion information and GBi information as an HMVP candidate to be added is present in motion vector prediction candidates included in the current motion vector prediction candidate list. The HMVP candidate inserted into the motion vector prediction candidate list may be at least one of HMVP candidates stored in an HMVP buffer (HMVP candidate list). For example, an HVMP candidate most recently stored in the HMVP candidate list may be added to the motion vector prediction candidate list. Furthermore, an HMVP candidate corresponding to a specific index (e.g., the HMVP index) in the HMVP candidate list or an HMVP candidate having an index corresponding to a value obtained by subtracting an HMVP index from the number of HMVP candidates may be added to the motion vector prediction candidate list. If the same motion vector prediction candidate is present, the coding apparatus terminates the configuration of the motion vector prediction candidate list without adding an HMVP prediction candidate.

If the same merge candidate is not present, the coding apparatus proceeds to step S1985 and inserts an HMVP merge candidate into the merge candidate list. The HMVP merge candidate may include motion information and GBi information.

FIG. 20 illustrates an example of a flowchart for configuring a merge candidate list by considering an HVMP candidate using inherited GBi information according to an embodiment of the present disclosure.

An embodiment of the present disclosure provides a method and apparatus for inheriting a GBi index or a GBi weight in a process of configuring a motion vector prediction candidate based on an HMVP. An embodiment of the present disclosure provides a method of performing prediction by inheriting, as a GBi index or a GBi weight of a current block, a GBi index or a GBi weight managed along with motion information in an HMVP buffer (or HMVP candidate list) when inter prediction using an HMVP candidate as a prediction candidate is performed without signaling a GBi index.

A method of performing prediction by inheriting, as a GBi index or a GBi weight of a current block, a GBi index or a GBi weight managed in an HMVP candidate list along with motion information may be performed as in the flowchart of FIG. 20. FIG. 20 is a flowchart in which a method of applying an inherited GBi index or a GBi weight is added to the flowchart of FIG. 18b. According to FIG. 20, the encoding apparatus 100 does not additionally signal a GBi index in a process of configuring a merge prediction candidate. Accordingly, the decoding apparatus 200 may decode a current block by using an inherited GBi index of a prediction candidate.

Referring to FIG. 20, in step S2005, the coding apparatus may insert, into a merge candidate list, spatial merge candidates derived by searching spatial neighboring blocks, and may inherit a GBi index and/or GBi weight of a merge candidate determined from a spatial neighboring block. In this case, the spatial neighboring blocks may include the neighboring blocks A0, A1, B0, B1, and B2 in FIG. 10. More specifically, the coding apparatus may add, to the merge candidate list, GBi information (bi-directional prediction weight or bi-directional prediction weight index) along with information on prediction directions, reference picture indices, and motion vectors of spatial neighboring blocks as merge candidates. Furthermore, the GBi index and/or GBi weight of the merge candidate determined from the spatial neighboring block may be inherited without being separately signaled. That is, a GBi index and/or GBi weight of a spatial merge candidate along with motion information of the corresponding spatial merge candidate added to the merge candidate list may be added to the merge candidate list.

In step S2010, the coding apparatus may insert, into the merge candidate list, a temporal merge candidate derived by searching temporal neighboring blocks, and may inherit a GBi index and/or GBi weight of a merge candidate determined from the temporal neighboring block. The temporal neighboring blocks may be located on a reference picture, that is, a picture different from a current picture where a current block is located. The reference picture where the temporal neighboring block is located may be denoted as a collocated picture or a col picture. The temporal neighboring block may be searched in order of a bottom right corner neighboring block and bottom right center block of a col-located block for the current block on the col picture. Furthermore, the GBi index and/or GBi weight of the merge candidate determined from the temporal neighboring block may be inherited without being separately signaled. That is, a GBi index and/or GBi weight of a temporal merge candidate along with motion information of the corresponding temporal merge candidate added to the merge candidate list may be added to the merge candidate list.

In step S2015, the coding apparatus determines whether the number of merge candidates included in a current merge candidate list is smaller than a maximum number of merge candidates. The maximum number of merge candidates may be set as a pre-determined number (e.g., 5). When the current number of merge candidates is not smaller than the maximum number of merge candidates (i.e., when the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S2020. In steps S2020 and S2025, the coding apparatus checks whether motion information and GBi information of an HMVP merge candidate are identical with those of the existing configured merge candidates. That is, the coding apparatus determines whether a merge candidate having the same motion information and GBi information as an HMVP merge candidate to be added is present in merge candidates included in the current merge candidate list. The HMVP merge candidate inserted into the merge candidate list may be at least one of HMVP candidates stored in an HMVP buffer (HMVP candidate list). For example, an HVMP candidate most recently stored in the HMVP candidate list may be added to the merge candidate list. Furthermore, an HMVP candidate corresponding to a specific index (e.g., HMVP index) in the HMVP candidate list or an HMVP candidate having an index corresponding to a value obtained by subtracting an HMVP index from the number of HMVP candidates may be added to the merge candidate list. If the same merge candidate is not present, the coding apparatus proceeds to step S2035.

If the same merge candidate is present, the coding apparatus may proceed to step S2030, may insert the HMVP merge candidate into the merge candidate list, and may inherit a GBi index and/or GBi weight of the HMVP merge candidate. The HMVP merge candidate may include motion information and GBi information.

In step S2035, the coding apparatus determines whether the number of merge candidates included in a current merge candidate list is smaller than a maximum number of merge candidates. The maximum number of merge candidates may be set as a pre-determined number (e.g., 5). When the current number of merge candidates is not smaller than the maximum number of merge candidates (i.e., when the current number of merge candidates is greater than or equal to the maximum number of merge candidates or when the current merge candidate list is fully filled), the coding apparatus may terminate the configuration of the merge candidate list.

When the current number of merge candidates is smaller than the maximum number of merge candidates (i.e., when the current merge candidate list is not fully filled), the coding apparatus proceeds to step S2040. In step S2040, the coding apparatus inserts an additional merge candidate into the merge candidate list. For example, the additional merge candidate may include an ATMVP, a combined bi-predictive merge candidate (when a slice type of a current slice is a B type) and/or a zero vector merge candidate.

FIG. 21 illustrates an example of a flowchart for processing video data according to an embodiment of the present disclosure. Operations illustrated in FIG. 21 may be performed by the inter prediction unit 180 of the encoding apparatus 100, the inter prediction unit 260 of the decoding apparatus 200, or the processor 2210 of FIG. 22. Hereinafter, a method for processing video data according to an embodiment of the present disclosure is described as being performed by the coding apparatus.

Referring to FIG. 21, in step S2110, the coding apparatus may obtain motion information and bi-directional prediction weight information for inter prediction of a current block. In an embodiment of the present disclosure, the motion information includes a first reference index (e.g., L0 reference index) and a first motion vector (e.g., L0 motion vector) related to a first reference picture (e.g., L0 reference picture) and a second reference index (e.g., L1 reference index) and a second motion vector (e.g., L1 motion vector) related to a second reference picture (e.g., L1 reference picture).

In an embodiment of the present disclosure, the bi-directional prediction weight information may be denoted as GBi information (GBi index or GBi weight). The bi-directional prediction weight information may include information on weights applied to a first prediction sample derived based on first direction prediction (L0 direction prediction) and a second prediction sample derived based on second direction prediction (L1 direction prediction). For example, the bi-directional prediction weight information may include a first weight applied to the first prediction sample and a second weight applied to the second prediction sample. Furthermore, the bi-directional prediction weight information may include indices indicating the first weight and the second weight in a pre-defined set. For example, a set related to the first weight w1 may be configured like $\{4, 5, 3, 10, -2\}$. The second weight w0 may be determined as a value obtained by subtracting the first weight w1 from 8 (w0=8−w1). In one embodiment, the first weight may be indicated by the bi-directional prediction weight information (bi-directional prediction weight index) among $\{4, 5, 3, 10, -2\}$.

In step S2120, the coding apparatus may derive a prediction sample of the current block based on the motion information and the bi-directional prediction weight information. For example, the coding apparatus may configure a merge candidate list, may obtain motion information and bi-directional prediction weight information indicated by a merge index in the merge candidate list, and may derive a prediction sample of a current block based on the motion information and the bi-directional prediction weight information. Furthermore, after configuring a motion vector prediction list, the coding apparatus may obtain motion information and bi-directional prediction weight information indicated by a motion vector prediction index in the motion vector prediction list, and may derive a prediction sample of a current block based on the motion information and the bi-directional prediction weight information.

In one embodiment, the coding apparatus may configure a merge candidate list, and may determine a merge candidate indicated by a merge index in the configured merge candidate list. In this case, the coding apparatus may add a spatial merge candidate and a temporal merge candidate of a current block to the merge candidate list, and may construct a merge candidate list by changing the merge candidate list using an HMVP candidate list when the number of merge candidates included in the merge candidate list is smaller than a preset number of candidates (e.g., a maximum number of candidates or a number smaller than a maximum number of candidates by a given value). In one embodiment, in order to change the merge candidate list by using the HMVP candidate list, the coding apparatus may determine whether HMVP prediction candidates included in the HMVP candidate list is identical with merge candidates included in the merge candidate list, and may add an HMVP prediction candidate to the merge candidate list when the HMVP prediction candidates included in the HMVP candidate list are different from the merge candidates included in the merge candidate list. In one embodiment, in order to add a spatial merge candidate and a temporal merge candidate to the merge candidate list, the coding apparatus may search for a spatial merge candidate and then perform search for a temporal merge candidate.

In step S2130, the coding apparatus may update an HMVP candidate list based on an HMVP candidate including the motion information and the bi-directional prediction weight information. The HMVP candidate list may be stored in an HMVP buffer. The HMVP candidate list may be denoted as the HMVP buffer. The HMVP candidate may include motion information (reference picture index, motion vector, and prediction direction) and bi-directional prediction weight information (GBi index, GBi weight) of a block already reconstructed in a current picture.

In one embodiment, in order to update the HMVP candidate, the coding apparatus may update the HMVP candidate list based on whether an HMVP candidate including same motion information and bi-directional prediction weight information as those of the current block is present in the HMVP candidate list. That is, in updating the HMVP candidate, a pruning process may be performed. The HMVP candidate list can be efficiently configured by removing a redundant HMVP candidate through the pruning process.

In one embodiment, in order to update the HMVP candidate, the coding apparatus may perform operations of resetting an index of the HMVP candidate list, determining whether a current index is smaller than the number of candidates within the HMVP candidate list, determining whether a candidate corresponding to the current index in the HMVP candidate list and an HMVP candidate to be added are identical when the current index is smaller than the number of candidates within the HMVP candidate list, performing pruning for removing the candidate corresponding to the current index and adding the HMVP candidate to be added to the HMVP candidate list when the candidate corresponding to the current index and the HMVP candidate to be added are identical, increasing the current index of the HMVP candidate list when the candidate corresponding to the current index and the HMVP candidate to be added are different from each other, and determining whether the increased current index is smaller than the number of candidates of the HMVP candidate list and whether the HMVP candidate and a candidate corresponding to the increased current index are identical.

In one embodiment, in order to determine whether the candidate corresponding to the current index in the HMVP candidate list and the HMVP candidate to be added are identical, the coding apparatus may determine prediction directions, reference indices, motion vectors, and bi-directional prediction weight indices of the candidate corresponding to the current index and the HMVP candidate are identical.

The embodiments described in the present disclosure may be implemented and performed on a processor, a micro processor, a controller or a chip. For example, the function units illustrated in each of the drawings may be implemented and performed on a computer, a processor, a micro processor, a controller or a chip.

FIG. 22 illustrates an example of a block diagram of an apparatus for processing video data according to an embodiment of the present disclosure.

A video data processing apparatus 2200 for processing video data includes a memory 2220 storing video data and a processor 2210 coupled to the memory and processing video data.

The processor 2210 according to an embodiment of the present disclosure may be composed of at least one processing circuit for processing video data, and may process an image signal by executing instructions for encoding or decoding video data. That is, the processor 2210 may encode the original image data or decode an encoded image signal by executing the aforementioned encoding or decoding methods.

The video data processing apparatus according to an embodiment of the present disclosure may include the memory 2220 storing a video signal and the processor 2210 coupled to the memory 2220. The processor 2210 may be configured to obtain motion information and bi-directional prediction weight information for inter prediction of a current block, derive a prediction sample of the current block based on the motion information and the bi-directional prediction weight information, and update an HMVP candidate list based on an HMVP candidate including the motion information and the bi-directional prediction weight information. In this case, the motion information includes a first reference index and a first motion vector related to a first reference picture (e.g., L0 reference picture) and a second reference index and a second motion vector related to a second reference picture (e.g., L1 reference picture) different from the first reference picture. The bi-directional prediction weight information (GBi information) may be used to derive a first weight value w0 applied to a first prediction sample from a first reference picture and a second weight value w1 applied to a second prediction sample from a second reference picture.

In one embodiment, the processor 2210 may update an HMVP candidate list based on whether a candidate identical with an HMVP candidate to be added is present in the HMVP candidate list.

In one embodiment, the processor 2210 may perform operations of checking a current index of an HMVP candidate list, determining whether the current index of the HMVP candidate list is smaller than the number of candidates within the HMVP candidate list, determining whether a candidate corresponding to the current index of the HMVP candidate list is identical with an HMVP candidate when the current index is smaller than the number of candidates within the HMVP candidate list, performing pruning for removing the candidate corresponding to the current index and adding the HMVP candidate to the HMVP candidate list when the candidate corresponding to the current index and the HMVP candidate are identical, increasing the current index of the HMVP candidate list when the candidate corresponding to the current index and the HMVP candidate are different from each other, and determining whether the increased current index is smaller than the number of candidates and whether the HMVP candidate is identical with a candidate corresponding to the increased current index.

In one embodiment, the processor 2210 may determine whether prediction directions, reference indices, motion vectors, and bi-directional prediction weight indices of the candidate corresponding to the current index and the HMVP candidate are identical.

In one embodiment, the processor 2210 may add a spatial merge candidate and temporal merge candidate of the current block to a configured merge candidate list, may change the merge candidate list by using the HMVP candidate list when the number of merge candidates included in the merge candidate list is smaller than a maximum number of candidates, and may determine a merge candidate indicated by a merge index in the merge candidate list.

In one embodiment, the processor 2210 may determine whether HMVP prediction candidates included in an HMVP candidate list are identical with merge candidates included in the merge candidate list, and may add an HMVP prediction candidate to the merge candidate list when the HMVP prediction candidate included in the HMVP candidate list is different from the merge candidates included in the merge candidate list.

In one embodiment, the processor 2210 may perform search for a temporal merge candidate after search for a spatial merge candidate.

A processing method to which the present disclosure is applied may be generated in the form of a program executed by a computer, and may be stored in a computer-readable recording medium. Multimedia data having a data structure according to the present disclosure may also be stored in the computer-readable recording medium. The computer-readable recording medium includes all types of storage devices and distributed storage devices in which computer-readable data is stored. The computer-readable recording medium may include a Blueray disk (BD), a universal series bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of a carrier (e.g., transmission through the Internet). Furthermore, a bit stream generated by an encoding method may be stored in the computer-readable recording medium or may be transmitted over a wired/wireless communication network.

Furthermore, an embodiment of the present disclosure may be implemented as a computer program product according to a program code. The program code may be performed in a computer according to an embodiment of the present disclosure. The program code may be stored on a computer-readable carrier.

Embodiments of the present disclosure may be implemented by a computer-executable component. The computer-executable component is configured to be executed in one or more processors of a computing device, and may be stored in a non-transitory computer-executable component. The computer-executable component according to an embodiment of the present disclosure may be configured to obtain motion information and bi-directional prediction weight information for inter prediction of a current block, derive a prediction sample of the current block based on the motion information and bi-directional prediction weight information, and update an HMVP candidate list based on an HMVP candidate including the motion information and the bi-directional prediction weight information. In this case, the motion information includes a first reference index and a first motion vector related to a first reference picture and a second reference index and a second motion vector related to a second reference picture different from the first reference picture. The bi-directional prediction weight information is related to a weight value applied to the first motion vector or the second motion vector.

In one embodiment, the computer-executable component may update the HMVP candidate list based on whether a candidate identical with an HMVP candidate to be added is present in the HMVP candidate list.

In one embodiment, the computer-executable component may perform operations of checking a current index of an HMVP candidate list, determining whether the current index of the HMVP candidate list is smaller than the number of candidates within the HMVP candidate list, determining whether a candidate corresponding to the current index of the HMVP candidate list is identical with an HMVP candidate when the current index is smaller than the number of candidates within the HMVP candidate list, performing pruning for removing the candidate corresponding to the current index and adding the HMVP candidate to the HMVP candidate list when the candidate corresponding to the current index and the HMVP candidate are identical, increasing the current index of the HMVP candidate list when the candidate corresponding to the current index and the HMVP candidate are different from each other, and determining whether the increased current index is smaller than the number of candidates and whether the HMVP candidate is identical with a candidate corresponding to the increased current index.

In one embodiment, the computer-executable component may determine whether prediction directions, reference indices, motion vectors, and bi-directional prediction weight indices of the candidate corresponding to the current index and the HMVP candidate are identical.

In one embodiment, the computer-executable component may add a spatial merge candidate and temporal merge candidate of the current block to a configured merge candidate list, may change the merge candidate list by using the HMVP candidate list when the number of merge candidates included in the merge candidate list is smaller than a maximum number of candidates, and may determine a merge candidate indicated by a merge index in the merge candidate list.

In one embodiment, the computer-executable component may determine whether HMVP prediction candidates included in an HMVP candidate list are identical with merge candidates included in the merge candidate list, and may add an HMVP prediction candidate to the merge candidate list when the HMVP prediction candidates included in the HMVP candidate list are different from the merge candidates included in the merge candidate list.

In one embodiment, the computer-executable component may perform search for a temporal merge candidate after search for a spatial merge candidate.

The decoding apparatus and the encoding apparatus to which the present disclosure is applied may be included in a digital device. The "digital device" includes all digital devices capable of performing at least one of the transmission, reception, processing and output of data, content, and a service, for example. In this case, processing, by the digital device, data, content, a service, etc. includes an operation of encoding and/or decoding the data, the content, the service, etc. Such a digital device is paired or connected (hereinafter "pairing") to another digital device, an external server, etc. over a wire/wireless network, and transmits and receives data, and converts the data if necessary.

The digital device includes all of standing devices, such as network TV, hybrid broadcast broadband TV (HBBTV), smart TV, internet protocol television (IPTV), and a personal computer (PC), and mobile devices (or handheld devices), such as a personal digital assistant (PDA), a smart phone, a tablet PC, and a notebook.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for processing video data, comprising:
generating a merge index of a current block;
obtaining motion information and bi-directional prediction weight information for inter prediction of the current block from a merge candidate in a merge candidate list of the current block indicated by the merge index;
deriving a prediction sample of the current block based on the motion information and the bi-directional prediction weight information; and
updating a history-based motion vector predictor (HMVP) candidate list based on an HMVP candidate including the motion information and the bi-directional prediction weight information,
wherein the motion information includes a first reference index and a first motion vector related to a first reference picture, and a second reference index and a second motion vector related to a second reference picture,
wherein the bi-directional prediction weight information is used to derive a first weight value applied to a first prediction sample from the first reference picture and a second weight value applied to a second prediction sample from the second reference picture, and
wherein based on that a number of the merge candidates included in the merge candidate list is greater than or equal to 15, the merge index is inversely binarized based on a binarization method of adding a fixed 3 bits to a truncated unary of the merge index.

2. The method of claim 1,
wherein updating the HMVP candidate list includes updating the HMVP candidate list based on whether a candidate identical with the HMVP candidate is present in the HMVP candidate list.

3. The method of claim 1,
wherein updating the HMVP candidate list includes:
checking a current index of the HMVP candidate list;
determining whether the current index is smaller than a number of candidates within the HMVP candidate list;
determining whether a candidate corresponding to the current index in the HMVP candidate list and the HMVP candidate are identical when the current index is smaller than the number of candidates within the HMVP candidate list;
performing pruning for adding the HMVP candidate to the HMVP candidate list by removing the candidate corresponding to the current index when the candidate corresponding to the current index and the HMVP candidate are identical; and
increasing the current index of the HMVP candidate list, and performing an operation of determining whether the increased current index is smaller than the number of candidates and whether the HMVP candidate and a candidate corresponding to the increased current index are identical, when the candidate corresponding to the current index and the HMVP candidate are different.

4. The method of claim 3,
wherein determining whether the candidate corresponding to the current index in the HMVP candidate list and the HMVP candidate are identical includes determining whether prediction directions, reference indices, motion vectors, and bi-directional prediction weight indices of the candidate corresponding to the current index and the HMVP candidate are identical.

5. The method of claim 1,
wherein obtaining the motion information and the bi-directional prediction weight information includes:
configuring the merge candidate list; and
determining the merge candidate in the merge candidate list indicated by the merge index,
wherein configuring the merge candidate list includes:
adding a spatial merge candidate and a temporal merge candidate of the current block to the merge candidate list; and
modifying the merge candidate list by using the HMVP candidate list when a number of merge candidates included in the merge candidate list is smaller than a preset number of candidates.

6. The method of claim 5,
wherein modifying the merge candidate list includes:
determining whether an HMVP prediction candidate included in the HMVP candidate list is identical with a merge candidate included in the merge candidate list; and
adding the HMVP prediction candidate to the merge candidate list when the HMVP prediction candidate included in the HMVP candidate list is different from the merge candidate included in the merge candidate list.

7. The method of claim 5,
wherein adding the spatial merge candidate and the temporal merge candidate to the merge candidate list includes performing search for the temporal merge candidate after search for the spatial merge candidate.

8. An apparatus for processing video data, comprising:
a memory for storing the video data; and
a processor coupled to the memory,
wherein the processor is configured to:
generate a merge index of a current block;
obtain motion information and bi-directional prediction weight information for inter prediction of the current block from a merge candidate in a merge candidate list of the current block indicated by the merge index;
derive a prediction sample of the current block based on the motion information and the bi-directional prediction weight information; and
update a history-based motion vector predictor (HMVP) candidate list based on an HMVP candidate including the motion information and the bi-directional prediction weight information,
wherein the motion information includes a first reference index and a first motion vector related to a first reference picture, and a second reference index and a second motion vector related to a second reference picture,
wherein the bi-directional prediction weight information is used to derive a first weight value applied to a first prediction sample from the first reference picture and a second weight value applied to a second prediction sample from the second reference picture, and
wherein based on that a number of the merge candidates included in the merge candidate list is greater than or equal to 15, the merge index is inversely binarized based on a binarization method of adding a fixed 3 bits to a truncated unary of the merge index.

9. The apparatus of claim 8,
wherein the processor is configured to update the HMVP candidate list based on whether a candidate identical with the HMVP candidate is present in the HMVP candidate list.

10. The apparatus of claim 8,
wherein the processor is configured to:
check a current index of the HMVP candidate list;
determine whether the current index is smaller than a number of candidates within the HMVP candidate list;
determine whether a candidate corresponding to the current index in the HMVP candidate list and the HMVP candidate are identical when the current index is smaller than the number of candidates within the HMVP candidate list;
perform pruning for adding the HMVP candidate to the HMVP candidate list by removing the candidate corresponding to the current index when the candidate corresponding to the current index and the HMVP candidate are identical; and
increase the current index of the HMVP candidate list, and perform an operation of determining whether the increased current index is smaller than the number of candidates and whether the HMVP candidate and a candidate corresponding to the increased current index are identical, when the candidate corresponding to the current index and the HMVP candidate are different.

11. The apparatus of claim 10,
wherein the processor is configured to determine whether prediction directions, reference indices, motion vectors, and bi-directional prediction weight indices of the candidate corresponding to the current index and the HMVP candidate are identical.

12. The apparatus of claim 8,
wherein the processor is configured to:
add a spatial merge candidate and temporal merge candidate of the current block to the merge candidate list,
modify the merge candidate list by using the HMVP candidate list when a number of merge candidates included in the merge candidate list is smaller than a preset number of candidates, and
determine the merge candidate in the merge candidate list indicated by the merge index.

13. The apparatus of claim 12,
wherein the processor is configured to:
determine whether an HMVP prediction candidate included in the HMVP candidate list is identical with a merge candidate included in the merge candidate list; and
add the HMVP prediction candidate to the merge candidate list when the HMVP prediction candidate included in the HMVP candidate list is different from the merge candidate included in the merge candidate list.

14. The apparatus of claim 12,
wherein the processor is configured to perform search for the temporal merge candidate after search for the spatial merge candidate.

15. A non-transitory computer-executable component in which a computer-executable component configured to be executed in one or more processors of a computing device is stored, wherein the computer-executable component is configured to:
generate a merge index of a current block;
obtain motion information and bi-directional prediction weight information for inter prediction of the current block from a merge candidate in a merge candidate list of the current block indicated by the merge index;
derive a prediction sample of the current block based on the motion information and the bi-directional prediction weight information; and
update a history-based motion vector predictor (HMVP) candidate list based on an HMVP candidate including the motion information and the bi-directional prediction weight information,
wherein the motion information includes a first reference index and a first motion vector related to a first reference picture, and a second reference index and a second motion vector related to a second reference picture,
wherein the bi-directional prediction weight information is used to derive a first weight value applied to a first prediction sample from the first reference picture and a second weight value applied to a second prediction sample from the second reference picture, and
wherein based on that a number of the merge candidates included in the merge candidate list is greater than or equal to 15, the merge index is inversely binarized based on a binarization method of adding a fixed 3 bits to a truncated unary of the merge index.

* * * * *